Feb. 21, 1967  J. RUBIN  3,304,732
METHOD AND APPARATUS FOR CHILLING ARTICLES, ESPECIALLY
FOOD ITEMS
Filed Dec. 29, 1965  11 Sheets-Sheet 1

INVENTOR
Julius Rubin
BY
Synnestvedt & Lechner
ATTORNEYS

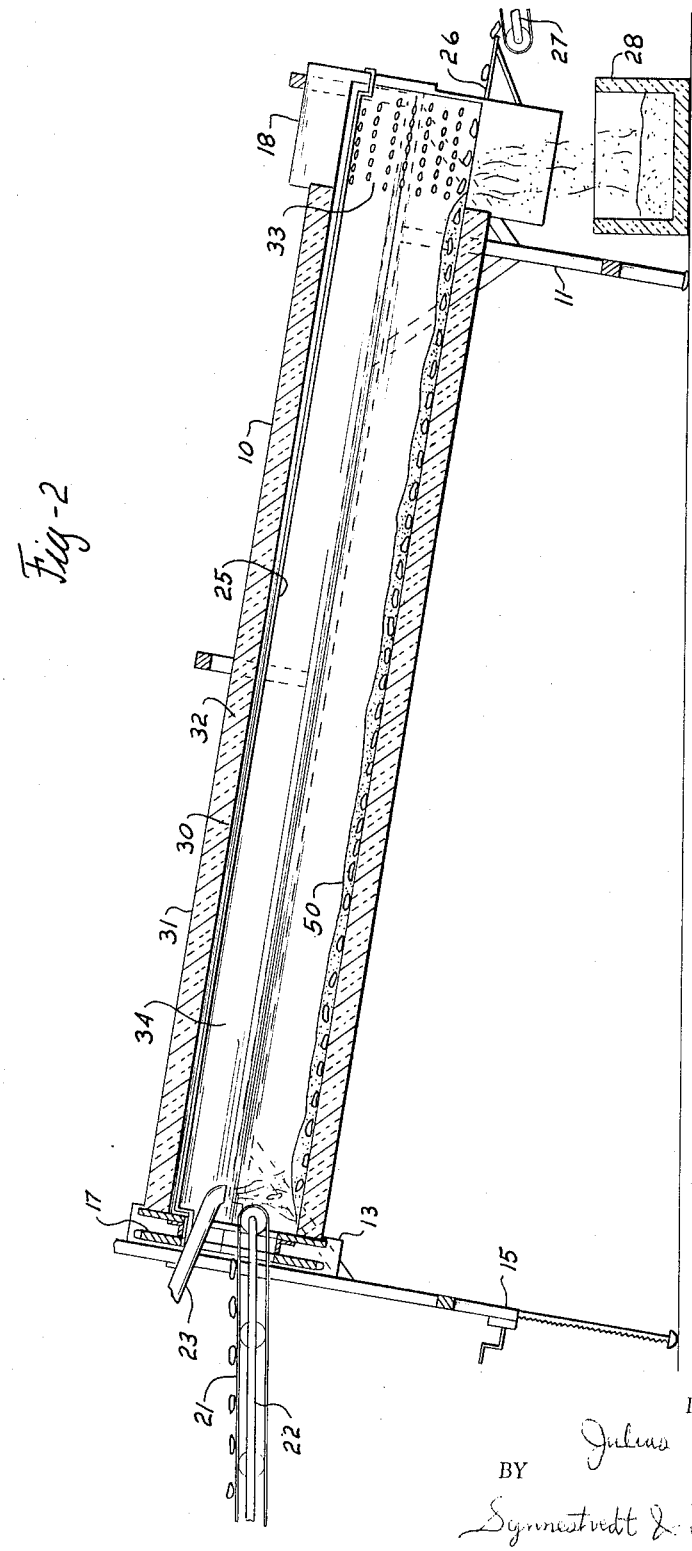

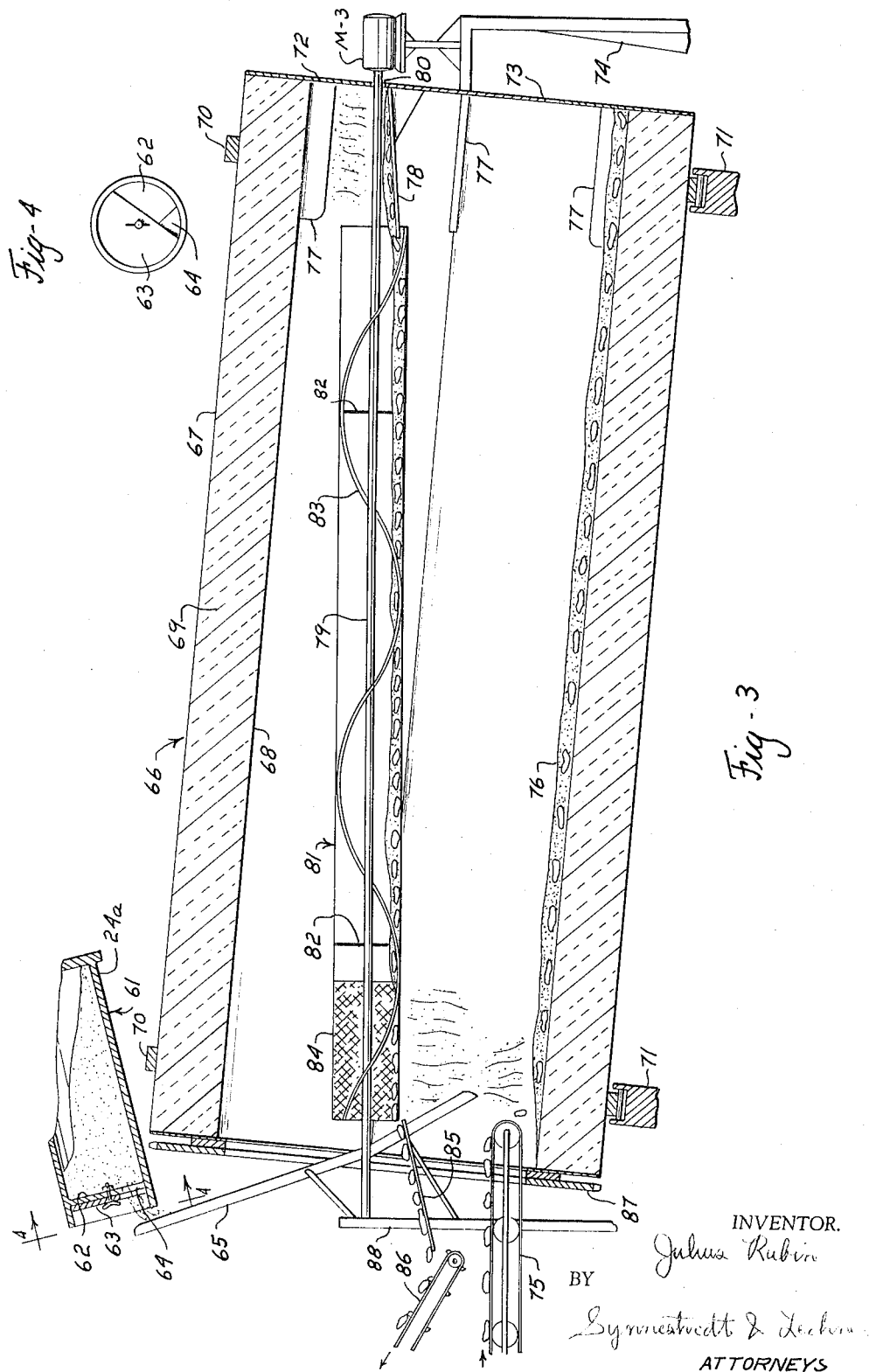

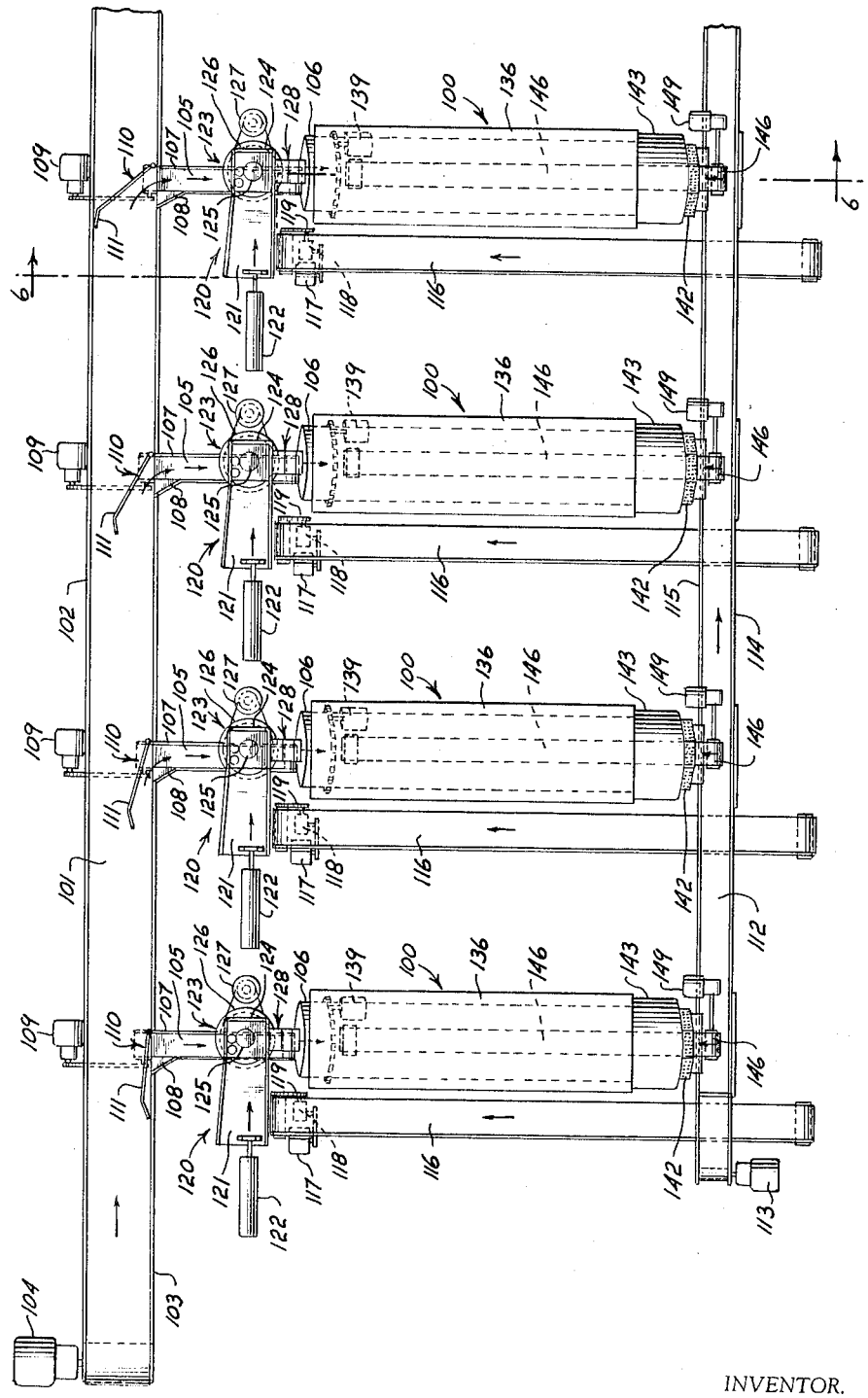

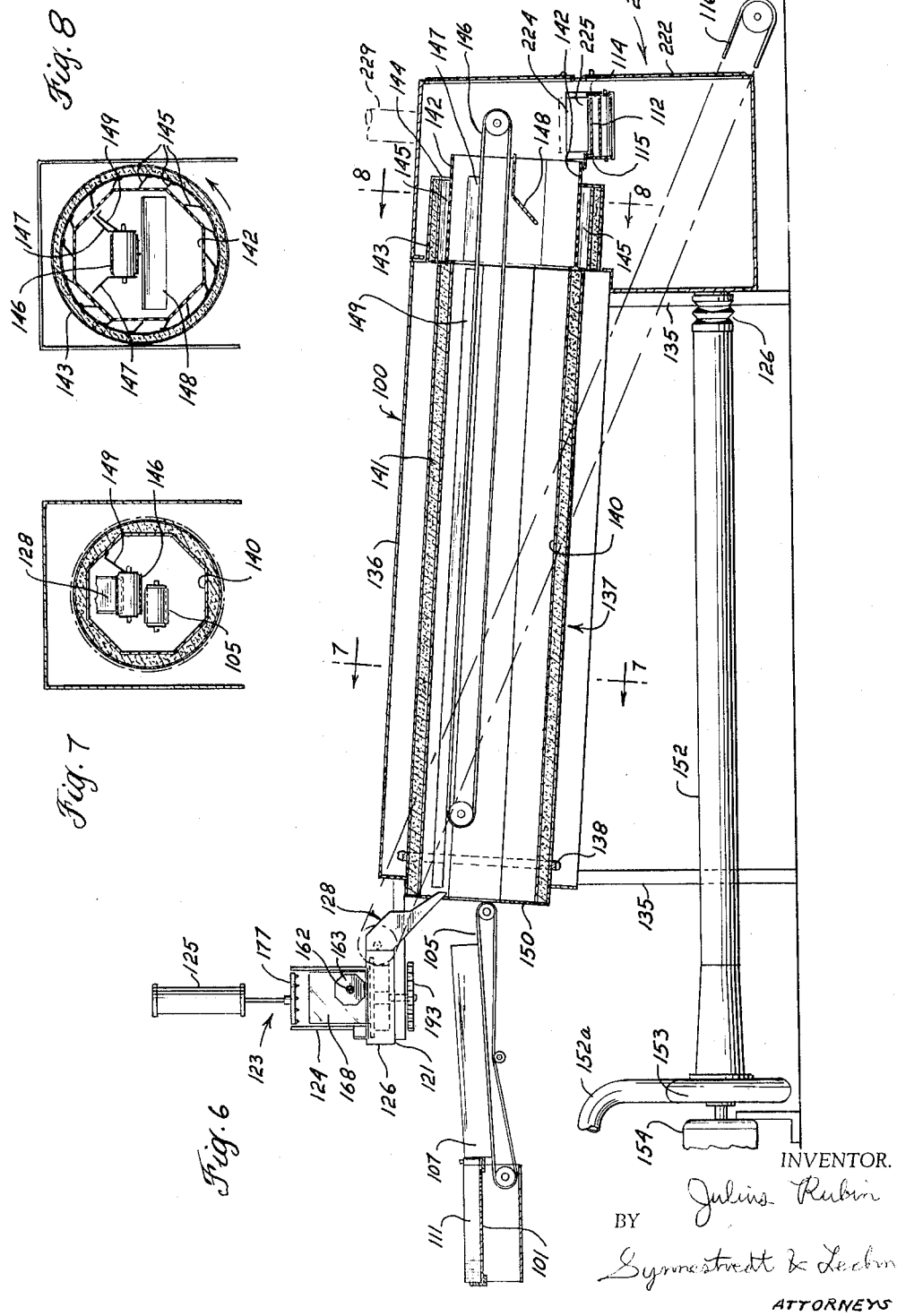

Feb. 21, 1967   J. RUBIN   3,304,732
METHOD AND APPARATUS FOR CHILLING ARTICLES, ESPECIALLY
FOOD ITEMS
Filed Dec. 29, 1965   11 Sheets-Sheet 6
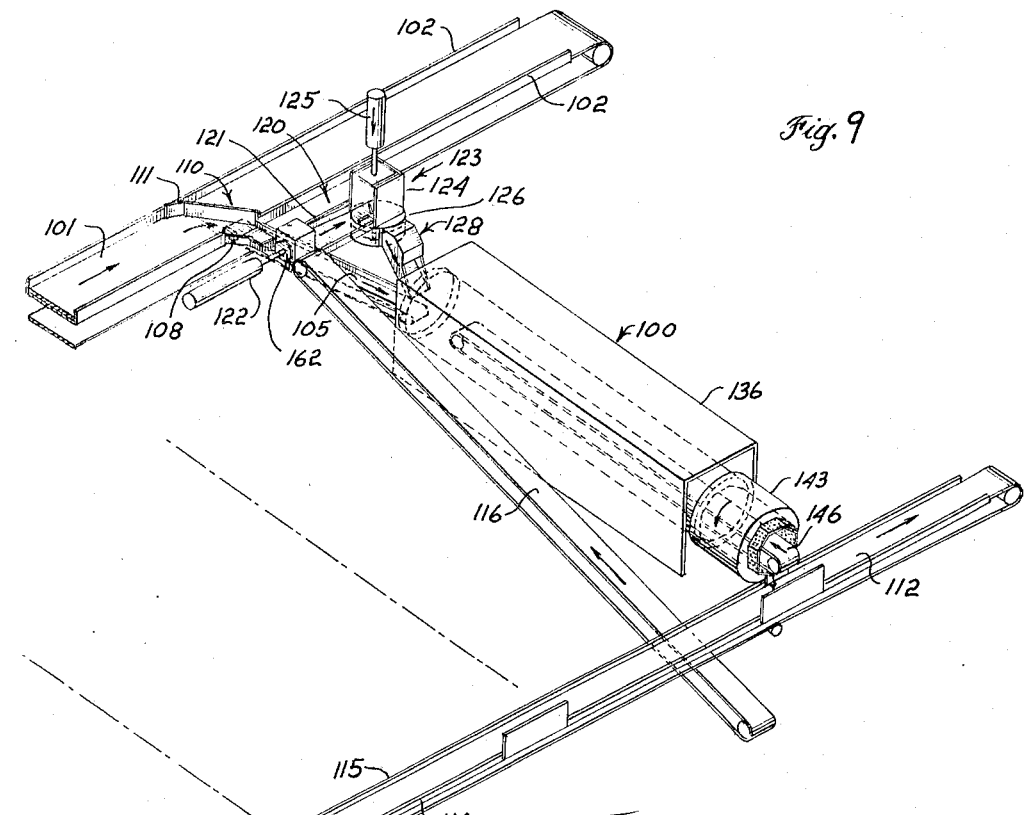
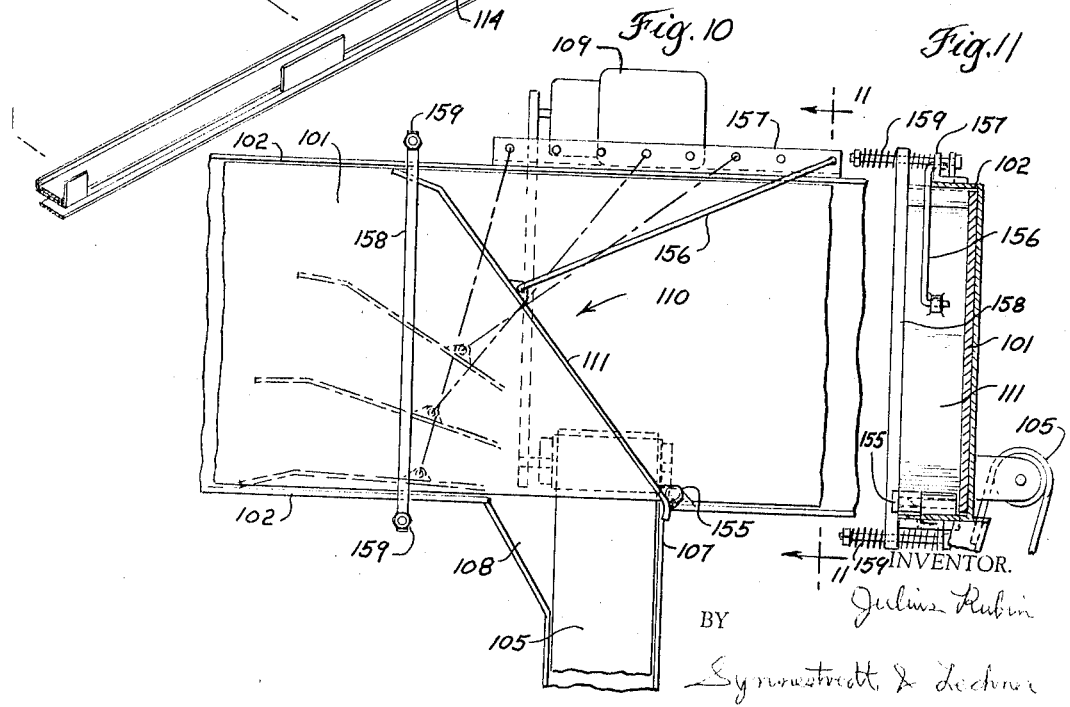
INVENTOR.
Julius Rubin
BY
Synnestvedt & Lechner
ATTORNEYS

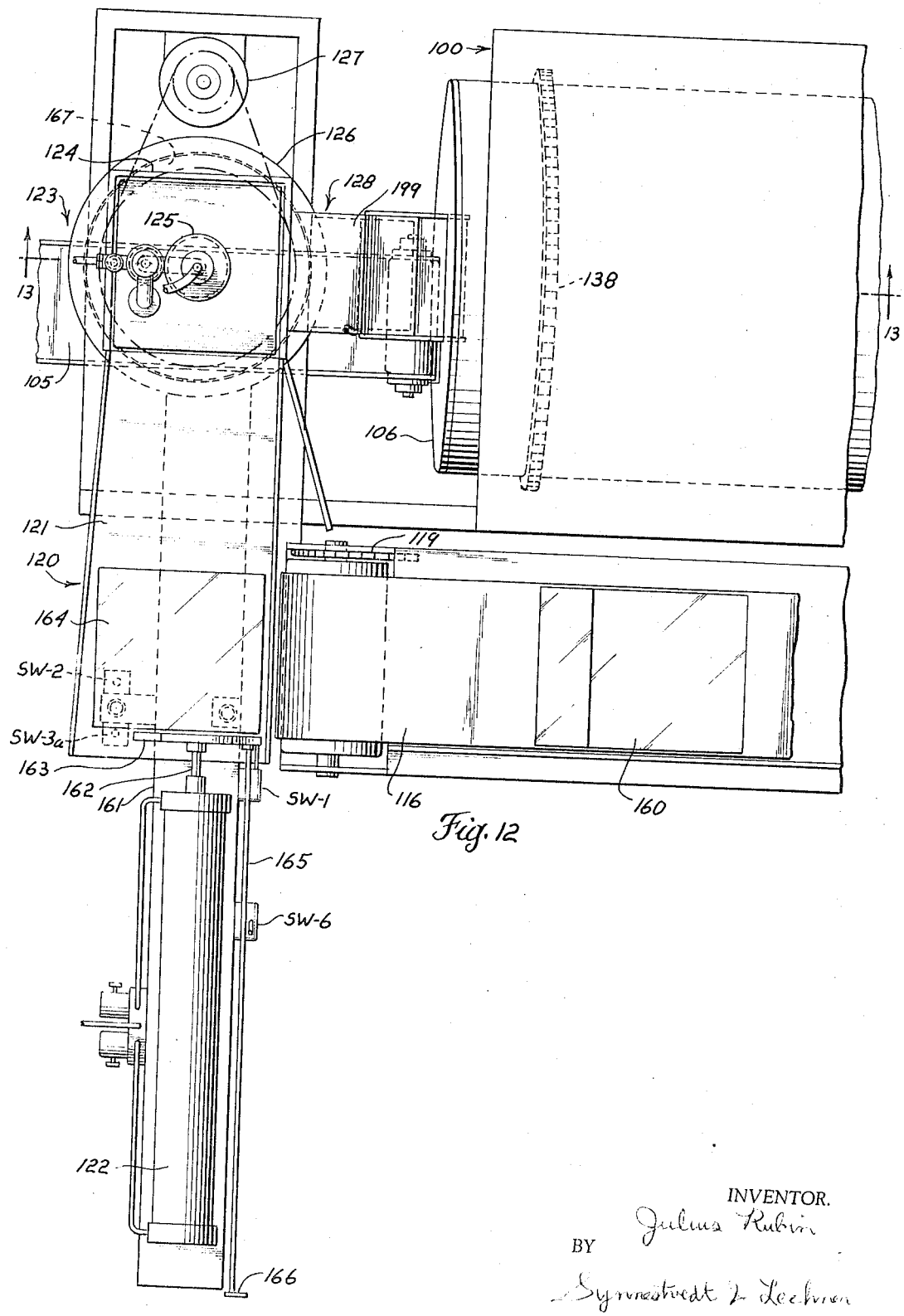

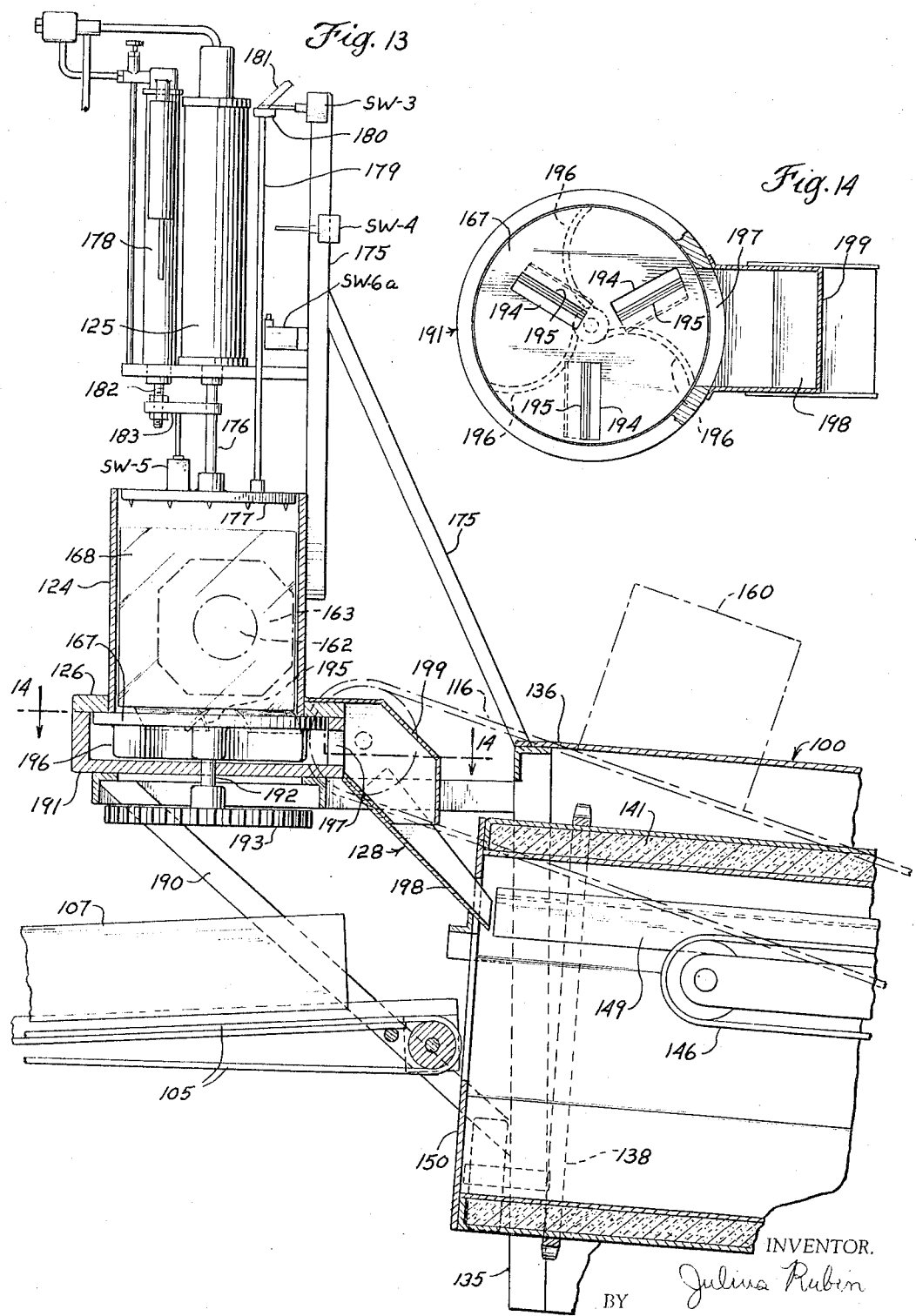

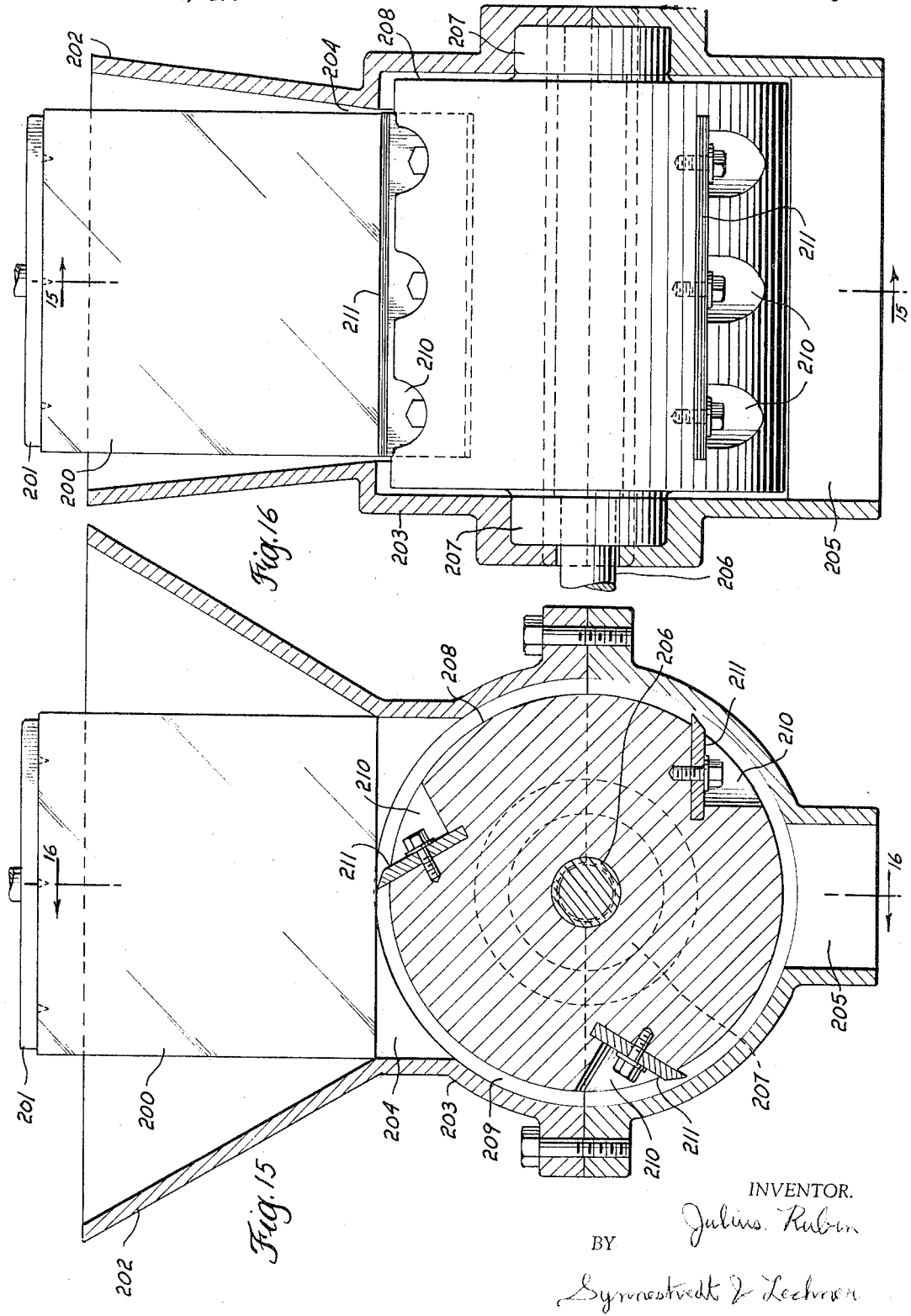

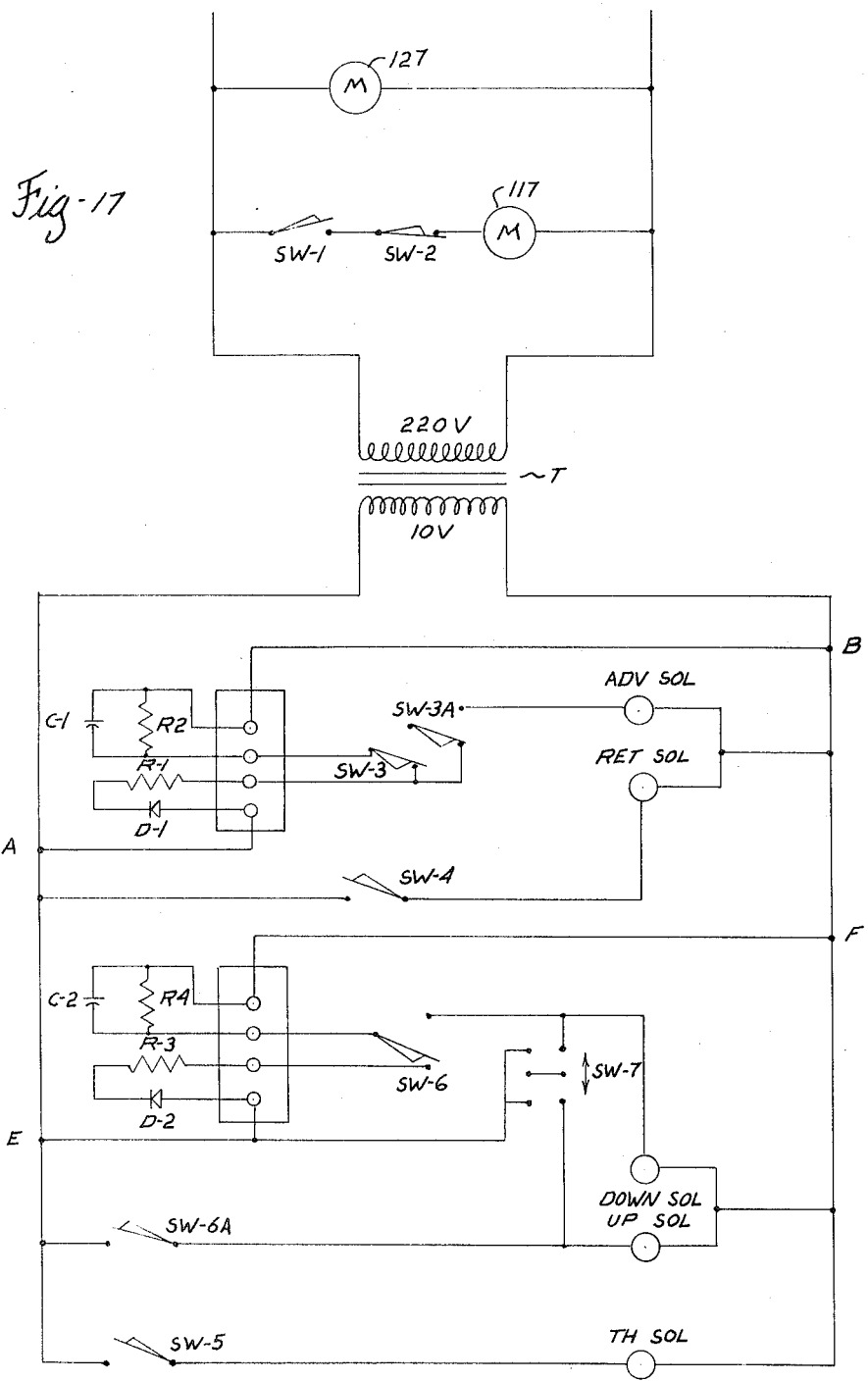

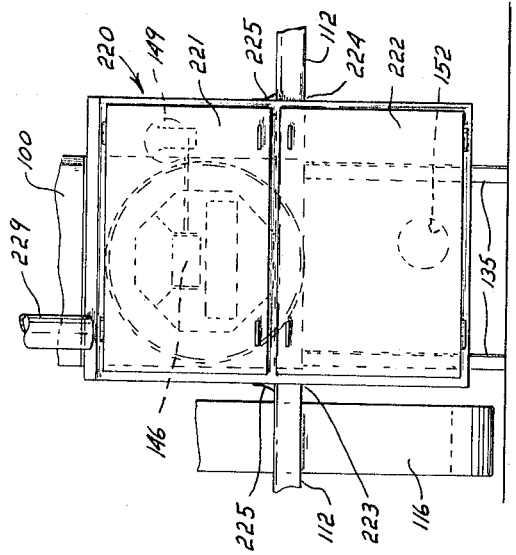
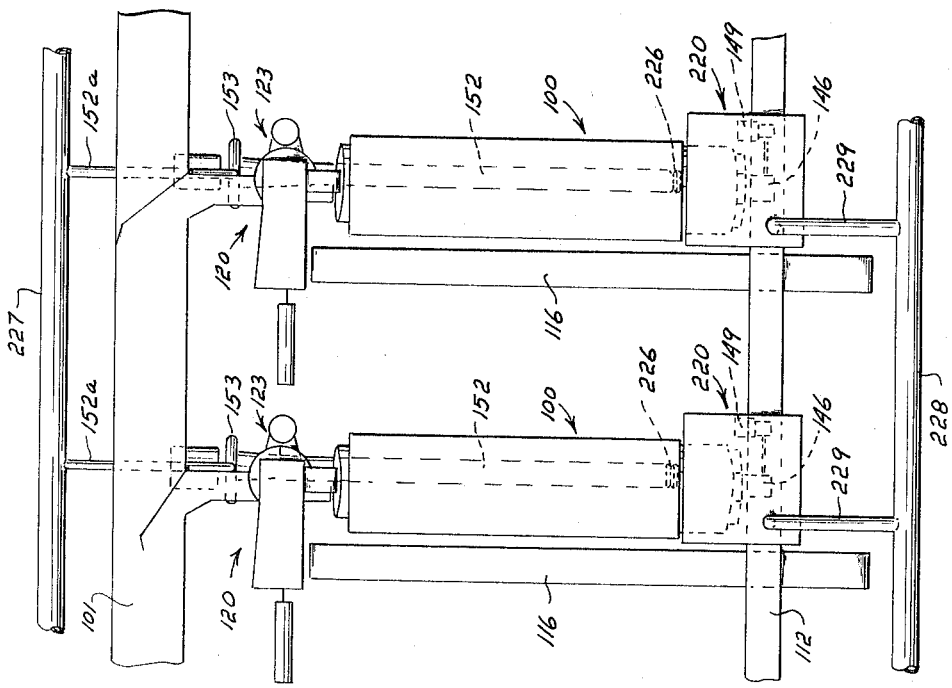

United States Patent Office 3,304,732
Patented Feb. 21, 1967

3,304,732
METHOD AND APPARATUS FOR CHILLING ARTICLES, ESPECIALLY FOOD ITEMS
Julius Rubin, Franklin Square, Nassau, N.Y., assignor to Thermice Corporation, Philadelphia, Pa., a corporation of Pennsylvania
Filed Dec. 29, 1965, Ser. No. 517,287
18 Claims. (Cl. 62—63)

This application is a continuation-in-part of my co-pending U.S. patent application, Serial Number 395,649, entitled "Method and Apparatus for Quick Freezing Individual Food Items" filed September 11, 1964, and assigned to the same assignee as this application.

This invention relates to the chilling of articles for a variety of purposes. Among the larger classes of articles which can be successfully chilled by the method and apparatus of this invention are individual or discrete items of food. The invention finds particular utility in applications where it is desirable or necessary to extract heat from articles quickly. Such operations can be appropriately called "quick chilling." Some quick chilling involves lowering of the temperature of the articles being chilled to a point below the freezing point. Such a quick chilling operation can be appropriately called "quick freezing."

As is fully brought out in my copending application, quick freezing is a desirable form of treatment for many classes of foods, and is a necessary treatment for some foods if they are to be successfully frozen at all. One advantage of quick freezing is that it reduces the damage to the cellular structure of the food. When the cells are undamaged the thawed food tastes fresh rather than cooked. Quick freezing also lowers the chemical activity of certain enzymes which alter the taste of food, thus preserving the fresh taste. Some foods are inherently fragile and by being frozen quickly acquire sufficient structural strength for handling and processing. Yet another advantage of individual quick freezing is that the items of food do not stick to one another and can be separated while frozen without the necessity of thawing an entire block or package of food items. This is a considerable convenience in the use of frozen food. Another factor which makes quick freezing of food desirable is that if the food can be frozen rapidly, high throughput rates can be established and maintained for a given equipment investment.

The method and equipment of the present invention permit the exploitation of the advantages of quick freezing for a wide variety of food products, some of which could not be satisfactorily or economically frozen before. Among the foods which can be quick frozen in accordance with the invention, with greatly improved results in comparison with the techniques used heretofore, are tomato slices, strawberries, cherries, sweet corn, ripe peeled bananas, onion rings, mushrooms, shrimp, and others.

Another class of treating operations to which the present invention relates is that of chilling to temperatures somewhat above the freezing point. For example, one serious problem in slaughter house and meat packing operations is the dissipation of animal heat from animal parts, and the removal of processing heat from cooked prepared meats, such as sausages and frankfurters. Heretofore, this problem has been dealt with by the use of large, expensive cold rooms and by tunnels utilizing cold air blasts. However, neither of these expedients has proved satisfactory. By the use of the present invention, however, animal heat and processing heat can be quickly and economically dissipated with only a small equipment investment.

While the foregoing discussion has been directed mainly to the chilling and freezing of foods, it should be kept in mind that on occasion it is desirable to extract heat from other articles quickly and efficiently, and that certain aspects of this invention are applicable in the treatment of items other than food.

In accordance with the present invention, the chilling or freezing is accomplished by the use of powdered Dry Ice or carbon dioxide. The items to be chilled and the powdered carbon dioxide are intermixed and brought into intimate contact with each other, following which the intimate contact is disrupted somewhat, as pointed out in my copending application. The sequence of bringing the powdered Dry Ice into intimate contact with the food items and then disrupting the contact is desirably repeated over and over until the food items are frozen. By repeatedly uncovering the food items or otherwise disrupting the contact between them and the Dry Ice, one dissipates the thin layer of carbon dioxide gas which tends to form at the interface between the powdered Dry Ice and each of the food items. It is important to dissipate the gas layer because, although the gas is cold, it has a relatively low coefficient of heat transfer, and operates as an insulating barrier between the food item and the solid carbon dioxide. The carbon dioxide gas layer forms inexorably as the result of the flow of heat from the items of food into the solid carbon dioxide or the Dry Ice granules to supply the latent heat of vaporization for the carbon dioxide.

The repeated disruption of Dry Ice particles and food items reduces the tendency of the Dry Ice to pack and "bridge," thereby making it possible to maintain more thorough contact of the Dry Ice with the food items. Furthermore, the intermixing of the Dry Ice particles with the food items tends to keep the items separated from one another, which has the effect of exposing more food surfaces to the Dry Ice and of preventing the food items, which are often wet, from freezing together.

The procedure outlined above for radically increasing the effectiveness of the powdered refrigerant can be performed in a number of different ways, but the preferred way is to intermix the food items with the Dry Ice and tumble them with the powdered Dry Ice until the food items are frozen. The preferred procedure of tumbling can itself be performed in several ways. When it is done, for example, in apparatus constructed according to the invention the tumbling results in the establishment of a bed of powdered Dry Ice having items of food on and in it, and in the repeated folding or overturning of the bed of Dry Ice and food to repeatedly cover and uncover the food with Dry Ice.

One aspect of this invention involves the provision of a chilling system utilizing powdered carbon dioxide as a chilling agent in the general manner described as above, which system is specially adapted to high throughput substantially continuous operations. In fact, some installations arranged in accordance with the invention, have achieved a feed throughput rate of approximately ten tons per hour. Among the features which contribute to the achievement of high capacity and continuous operation are the provision of a number of ganged and coordinated chilling tumblers wherein the powdered carbon dioxide and items to be chilled are mixed and repeatedly folded together, the provision of common input and output handling equipment for the items being fed to the tumblers for chilling and being removed from the tumblers after chilling, the provision of powdered carbon dioxide feed equipment for the tumblers capable of delivering carbon dioxide powder at rates adequate to meet the requirements of the system, and control equipment for adjusting the flow rates of powdered carbon dioxide, items to be chilled, and the mixture of carbon dioxide and items so that an efficient operation is performed under steady state conditions.

In accordance with another aspect of the invention, a method and apparatus are provided for converting solid carbon dioxide in block or cake form into powdered carbon dioxide for feed to the chilling tumbler in a form suitable for, and at rates sufficient to meet the needs of, the tumbler. The equipment so provided makes it possible to supply the carbon dioxide to the treating system in block form. The blocks are easily handled, stored, and shipped. Furthermore, block carbon dioxide is a source of powdered carbon dioxide which is very efficient from a thermodynamic standpoint.

It is known that powdered carbon dioxide can be obtained from liquid carbon dioxide at the point of use as an alternate source of powdered Dry Ice. However, it is preferred in accordance with the invention to use block carbon dioxide as the source of the powder instead of liquid carbon dioxide. There are several reasons for this preference.

Some of these reasons are related to the thermodynamic properties of powdered carbon dioxide. When liquid is converted to carbon dioxide powder, it is flashed through a pressure reducing nozzle or orifice. Upon passing through the nozzle, about 46% of the liquid carbon dioxide is converted to snow or powder and the remainder is converted to carbon dioxide vapor. Thus, from a pound of carbon dioxide liquid, one obtains only about one half pound of solid carbon dioxide which is usable in accordance with the invention. The B.t.u. absorbing capacity of the other one-half pound of carbon dioxide liquid is, in effect, lost to the user because it has been expended in the change of state from liquid to solid and vapor which occurs upon passage through the nozzle. By contrast, a pound of block carbon dioxide can be converted to a pound of carbon dioxide powder with almost no loss. Therefore, substantially all of the B.t.u. absorbing capacity of a pound of block carbon dioxide is available for extracting heat from the items to be chilled in accordance with the invention. In a manner of speaking, block carbon dioxide is about twice as efficient a source of chilling capacity for the user than is liquid.

Other reasons for the preference for block carbon dioxide over liquid carbon dioxide as a source of powder are basically mechanical in nature. With a nozzle of fixed size, it is difficult to effectively regulate and vary the rate of flow through the nozzle and hence, the rate at which carbon dioxide powder is formed from liquid. The powder formed from liquid is flocculent in nature and thus tends to pack. This property makes it relatively more difficult to obtain satisfactory separation of the Dry Ice powder from the items being chilled in the manner contemplated by the invention.

One problem which results from the use of solid carbon dioxide which is initially supplied to the chilling system in block or cake form, especially in a system which is operated continuously, is that the powdered carbon dioxide produced by the shaving of a series of blocks of carbon dioxide is necessarily formed in batches the size of a single block of carbon dioxide, the batches of powder being separated in time from one another by the interval during which a succeeding block is brought into position for shaving. In other words, the feed of powdered carbon dioxide tends to be intermittent in nature, while the demands of the chilling tumblers, especially in a continuous system, tend to be constant and continuous. In accordance with the invention, carbon dioxide block feeding and shaving equipment is provided which reduces the inherent periodic interruptions in the supply of powdered carbon dioxide and Dry Ice to a level which presents no problem. Furthermore, in accordance with the invention such equipment cooperates with carbon dioxide recycle means associated with the chilling tumbler to assure a steady supply of carbon dioxide powder to the input end of each tumbler at all times, even during interruptions in the block shaving operation.

It is an object of this invention to provide a chilling system for lowering the temperature of discrete items by the use of solid carbon dioxide which is capable of rapid chilling, and freezing, if desired, and is capable of handling a high throughput of items to be chilled.

Another object of this invention is the provision of a method and apparatus for chilling articles by the use of powdered carbon dioxide in which the carbon dioxide is supplied in block or cake form.

A further object of this invention is the provision of block carbon dioxide shaving and handling equipment capable of producing carbon dioxide powder in quantities and at rates suitable for use in a quick chilling system.

Still another object of the invention is the provision of a chilling system for lowering the temperature of articles by the use of carbon dioxide supplied initially in block or cake form, having control means for adjusting the flow rates of material through the system to provide for stable steady-state operation and rapid accommodation to variations in flow rates resulting from external conditions.

It is a further object of the invention to provide a chilling system for lowering the temperature of articles by the use of solid carbon dioxide which includes means for efficiently collecting and disposing of carbon dioxide vapor which results from the chilling operation.

The above objects together with other objects and purposes can be more readily understood by considering the following detailed description together with the accompanying drawings in which:

FIGURE 2 is a vertical sectional elevational view of a portion of the apparatus of FIGURE 1 with some parts omitted for the sake of simplicity and corresponds to FIGURE 2 of my copending application;

FIGURE 3 is a vertical sectional elevational view of another embodiment of the invention with some parts omitted for the sake of simplicity, and corresponds to FIGURE 6 of my copending application;

FIGURE 4 is a fragmentary elevational view taken on the line 4—4 of FIGURE 3, showing a powdered carbon dioxide feeding apparatus and corresponds to FIGURE 7 of my copending application;

FIGURE 5 is a somewhat diagrammatic plan view of a chilling system constructed in accordance with the invention, with some parts omitted from the view for the sake of simplicity, the chilling system employing a battery of four ganged tumblers similar to the tumbler of FIGURE 1, but having certain modified features;

FIGURE 6 is a sectional elevational view taken approximately on the line 6—6 of FIGURE 5, but on a somewhat enlarged scale;

FIGURE 7 is a cross-sectional view taken on the line 7—7 of FIGURE 6, showing the configuration of the interior of a tumbler;

FIGURE 8 is a cross-sectional view taken on the line 8—8 of FIGURE 6, showing certain recycle equipment provided at the output end of a tumbler;

FIGURE 9 is a somewhat diagrammatic isometric view of one of the tumbler units of the system shown in FIGURE 5, with some parts omitted for the sake of simplicity;

FIGURE 10 is a fragmentary plan view of input conveyor and metering equipment associated with the input end of each of the tumblers shown in the system of FIGURE 5, the view being on a somewhat enlarged scale;

FIGURE 11 is a cross-sectional view taken on the line 11—11 of FIGURE 10;

FIGURE 12 is a fragmentary plan view on an enlarged scale as compared to FIGURE 5, showing block carbon dioxide feed equipment and block carbon dioxide shaving equipment of the embodiment of FIGURE 5, and which, as is preferred, is associated with the input end of each of the tumblers;

FIGURE 13 is in part an elevational view and in part a cross-sectional view taken on the line 13—13 of FIGURE 12;

FIGURE 14 is a plan sectional view of the block Dry Ice shaver shown in FIGURE 13, the view being taken on line 14—14 of FIGURE 13;

FIGURE 15 is a sectional elevational view of a modified form of block carbon dioxide shaving equipment, the view being taken on line 15—15 of FIGURE 16;

FIGURE 16 is a sectional view of the apparatus shown in FIGURE 15, the view being taken on line 16—16 of FIGURE 15;

FIGURE 17 is a simplified control diagram showing the arrangement of control elements for block carbon dioxide handling and shaving equipment of the kind illustrated in the embodiment of FIGURES 5 to 14;

FIGURE 18 is a somewhat diagrammatic fragmentary plan view of the chilling system shown in FIGURE 5, showing the special carbon dioxide vapor handling means provided in accordance with the invention; and, FIGURE 19 is a fragmentary end elevational view of the tumbler shown in FIGURE 6, the view being taken looking toward the left in FIGURE 6.

Figure 1:
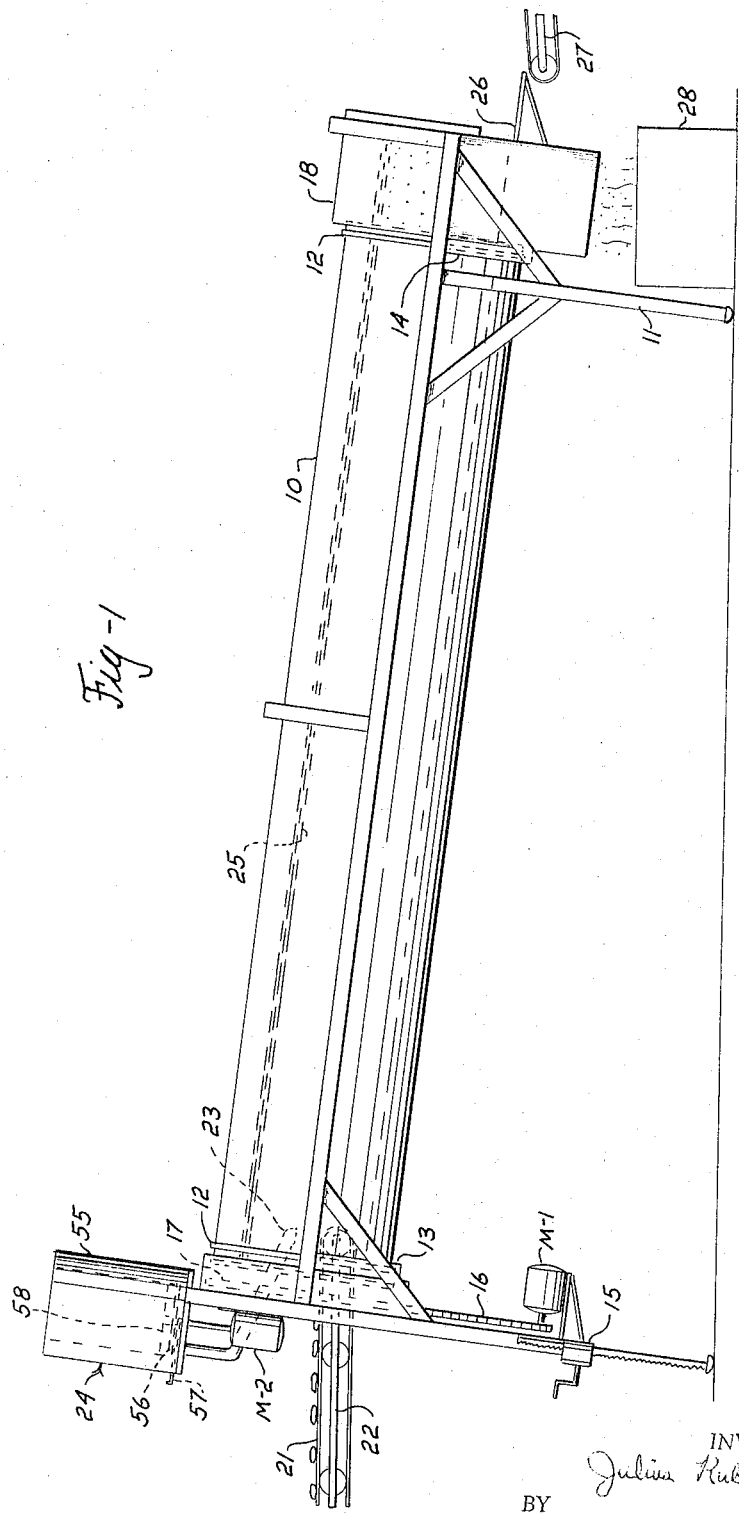
FIGURE 1 is a side elevational view of a chilling and freezing apparatus constructed in accordance with the invention and corresponding to FIGURE 1 of my copending application Serial Number 395,649.

Attention is directed to FIGURE 1 which shows a preferred form of the equipment. The tumbler 10 is mounted for rotation on frame 11 by means of bearing bands 12 which ride in cradles 13 and 14 of the frame 11. The frame 11 is provided with jack 15 which is mounted on the legs of the frame below the entrance end of the unit. By varying the setting of the jack it is possible to tilt the tumbler somewhat, and to vary the angle of tilt for reasons which will appear later. The tumbler is rotated on the cradles 13 and 14 by motor M–1 which drives through a chain 16 and circumferential sprocket 17.

At the low end of the tumbler 10 there is mounted a shroud 18 which surrounds the end of the tumbler, but does not rotate with it.

The input end of the tumbler is at the left as shown in FIGURE 1. The input equipment includes a food conveyor 21 mounted on frame 22 and a Dry Ice chute 23. The chute is fed by means of a granulated Dry Ice feeder 24, which is mounted on frame 11 above the entrance end of the tumbler 10. As can be seen in FIGURE 1 the feeder 24 comprises a small generally upright barrel 55 which has a feed hole 56 in the bottom thereof. An adjustable feed valve in the form of a thin strip 57 of metal slidably mounted at the bottom of the barrel adjacent hole 56 provides for varying the size of the hole to vary the feed rate.

The feeder is provided with a stirrer 58 driven by motor M–2. The stirrer is rotated slowly to prevent the granulated Dry Ice inside the feeder from packing and bridging, since such packing would disrupt the metered flow of Dry Ice through hole 56 into chute 23. It should be pointed out here that the Dry Ice feeder illustrated and described in connection with FIGURES 3 and 4 can also be utilized in an apparatus of the kind illustrated in FIGURES 1 and 2, and that the feeder of FIGURE 1 can be used with the unit shown in FIGURE 3.

A scraper 25 is mounted on the frame 11 so that it extends into the tumbler 10 near the top thereof. In the unit shown in FIGURES 1 and 2, the scraper extends through the full length of the tumbler, and it is attached to the frame at both ends. However, in some constructions it may be desirable to terminate the scraper short of the exit end. In such a case the scraper is attached to frame 11 at the entrance end only and is cantilevered into the tumbler for a desired distance, such as several feet.

At the output end of the tumbler 10 is a food chute 26 which guides food leaving the tumbler onto take-away conveyor 27.

The structure of the tumbler 10 can best be understood by a study of FIGURE 2. The tumbler has a liner 30. The liner is configured so that the passage through the tumbler is of preselected shape. One shape which has proved quite practical is that of polygons having moderate numbers of sides such as hexagons or octagons. For some food items closed curve shapes such as ellipses are useful. Furthermore, passages of circular cross section are also useful with some kinds of food items. The liner 30 should be constructed of a material with which food can safely be contacted and which can withstand the cold environment prevailing within the tumbler without being harmed. Stainless steel has been found to meet these requirements very well. While it is possible to provide the liner 30 with baffles and other elements for increasing the tumbling action, it is generally preferred that such baffles not be employed except immediately adjacent the ends of the tumbler. One reason for this preference is that a tumbler having an uncluttered interior is more sanitary and easier to clean.

The space between the outer cylindrical shell 31 of the tumbler 10 and the inner liner 30 is desirably filled with an insulating material such as polyurethane foam indicated at 32.

FIGURE 2 also illustrates the mode of cooperation between the various pieces of equipment shown in FIGURE 1. From FIGURE 2 it can be seen that the food conveyor 21 extends into the entrance end of the tumbler passage so that it will deliver items of food into the tumbler passage and deposit them in the bed of Dry Ice established therein. FIGURE 2 also shows that the Dry Ice chute 23 is mounted so that it will deliver Dry Ice into the entrance end of the tumbler passage concurrently with the food items and thereby continually establish the rearmost portion of the bed of powdered Dry Ice which is maintained within the tumbler.

Almost all of the powdered Dry Ice remains in a food freezing bed 50 in the lower portion of the tumbler during operation. Throughout most of the length of the tumbler, there is little or no tendency for the Dry Ice powder to stick to the liner and thus be carried into the upper portion of the tumbler during rotation thereof. However, the entrance end of the tumbler is relatively warmer and the amosphere in this region is relatively more humid than in the rest of the tumbler; thus, such sticking of Dry Ice as does occur tends to be concentrated near the entrance end of the tumbler, as does formation of water ice on the walls of the tumbler. The purpose of the scraper 25 is to knock down Dry Ice and water ice which occasionally sticks to the liner 30 and is carried to the top of the tumbler passage. When the tumbler passage is polygonal in cross section, such as the hexagonal passage shown in FIGURE 8, the scraper 25 is desirably spaced from the axis of the passage a distance approximately equal to the minor radius of the polygon. In this way the scraper contacts each side of the liner 30 once during each revolution.

FIGURE 2 shows one form of recycle equipment for returning the excess portion of the Dry Ice from the exit end of the tumbler back into the tumbler. The recycle operation can also be performed in other ways. In the embodiment shown in FIGURE 2, the tumbler passage is provided at the exit end thereof with a screen wall 33. The size of the screen grid is such that the Dry Ice powder will tend to fall through the screen, whereas the items of food will not. In this way a separation between the two can be effected. A shroud 18 is preferably mounted around the end portion of the tumbler which has a screen wall to collect the Dry Ice which passes out of the tumbler through the screen. The Dry Ice collected in shroud 18 falls through the open bottom of the shroud into the collecting barrel 28. The ice so collected in barrel 28 is returned at convenient intervals to the Dry Ice feeder 24.

Attention can now be turned to the embodiment of the invention shown in FIGURES 3 and 4. The Dry Ice feeder shown in these figures can be used with the unit of FIGURE 3, with a unit of the kind shown in FIGURE 1, and with units of the type shown in FIGURE 6. The Dry Ice dispenser 24a in FIGURE 3 is generally barrel shaped, the barrel 61 being mounted for rotation by a motor (not shown) at an angle to the horizontal. The low end of barrel 61 is formed of two segments 62 and 63, the relative angular positions of which can be varied to provide a feeding opening 64 (see FIGURE 4) of selected size. By varying the size of this opening it is possible to vary the feed rate of granulated Dry Ice. The barrel 61 is rotated slowly in operation, and the Dry Ice falls through the opening 64 on to chute 65 at a pre-selected rate.

The apparatus of FIGURE 3 incorporates many of the features of the apparatus discussed earlier in connection with FIGURES 1 and 2, but differs from that apparatus in that the frozen food is delivered from it at the same end of the tumbler as the unfrozen food is fed to it. In such an arrangement, the end of the tumbler opposite the input end can be substantially closed. This is an advantage because it reduces the number of flow paths for heat to enter the unit. Other advantages of this type of unit include a simplified recycle and a more complete utilization of the cold volume of the tumbler. In FIGURE 3 it can be seen that the tumbler 66 has an outer shell 67 which is separated from the inner liner 68 by insulating material 69. The tumbler 66 is mounted by means of bearing bands 70 for rotation on cradles 71. The liner 68 is hexagonal in cross section like the liner 30 in FIGURE 2. The tumbler, at its right-hand end as viewed in FIGURE 3, is provided with an end ring 72, which is fastened to the end of the tumbler for rotation therewith. The hole in the end of the tumbler defined by the inner edge of the end ring 72 is closed, for the most part, by end disc 73 which is fixed to frame member 74 and does not rotate with the tumbler. (A narrow circular slot 80 is established by the disc and ring.) An input conveyor 75 is positioned to feed food items into the left-hand end of the tumbler on to the bed of Dry Ice which is established there by the Dry Ice flowing down chute 65. The bed of Dry Ice 76 with food items therein, is substantially similar in configuration and function to the bed of Dry Ice 50 shown in FIGURE 2.

Baffles 77 are mounted at the angles of the polygonal liner 68 at the right-hand end thereof in a position to pick up the portion of the Dry Ice bed and the food contained therein which reaches the right-hand end of the tumbler. The food so picked up is deposited on chute 78 which is cantilevered into the right-hand end of the assembly from end disc 73.

A motor M-3 is mounted on frame 74. It is connected to a shaft 79 which extends through the circular slot 80, defined by disc 73 and ring 72, to the left-hand end of the tumbler 66 where it is journaled to frame member 88. Shaft 79 carries return tube 81 which is mounted on it by means of spiders 82. As can be seen from FIGURE 3 the return tube 81 is generally horizontally mounted although it may be given a slight pitch upwardly or downwardly. It is so positioned within tumbler 66 that it receives food and Dry Ice from chute 78 at the right-hand end of the tumbler. Inside the return tube 81 is a generally helical feed blade 83 which is mounted to rotate with the tube. The wall of the tube 81 at the left-hand end is of screen configuration as shown at 84. A chute 85 is mounted on frame 88 and extends into the end of tumbler 66 to a point where it can receive food issuing from the end of return tube 81. The chute 85 delivers the frozen food items to take-away conveyor 86.

The operation of the apparatus of FIGURE 3 is generally as follows. Tumbler 66 is rotated by a chain drive which includes sprocket 87. Dry Ice is fed into the left-hand end of the unit on chute 65 and food is fed in on conveyor 75. The food and Dry Ice travel in a bed 76 through the tumbler to the right-hand end where they are picked up, and placed on chute 78 which feeds them into return tube 81. This tube is slowly rotated by means of motor M-3 and the Dry Ice and food pass to the left through tube 81, being assisted in their movement by blade 83. The unconsumed Dry Ice which approaches the left-hand end of return tube 81 falls through the screen wall thereof on to the rightwardly moving bed of Dry Ice 76. In this manner a very simple recycle of the Dry Ice is accomplished. The items of frozen food which have been thus separated from the Dry Ice fall out of the end of tube 81 on to chute 85 and ultimately take-away conveyor 86.

Attention is now directed to FIGURES 5 and 9 from which an understanding of the arrangement and operation of a multi-unit embodiment of the invention can be obtained. In FIGURE 5 there is shown a battery of four ganged chilling tumbler units 100, which are arranged generally side by side. The direction of feed through the tumblers 100 is the same for all of them, and as the plan view of FIGURE 5 is drawn, the feed through the tumblers is from the top of the figure toward the bottom. The four tumblers in FIGURE 5 are served by a common input conveyor 101. The conveyor may be of several forms, but a belt type unit is quite satisfactory. The conveyor 101 is provided with side walls 102 and 103 to prevent the food or other items being delivered for chilling from falling off the edge. A motor 104 is provided for driving the conveyor from left to right as FIGURE 5 is drawn.

Each of the tumblers 100 is provided with an auxiliary conveyor 105, each of which extends from the common input conveyor 101 to the entrance end 106 of its tumbler. The auxiliary conveyors 105, like the common conveyor, have side walls 107 and 108 for retaining the food on the conveyors. These conveyors may also be of several forms although the belt type is quite suitable. Each conveyor 105 is provided with a drive motor 109 which is operated so that its conveyor delivers items to be chilled from the common conveyor into the input end of a tumbler 100, that is, in a direction from top to bottom as FIGURE 5 is drawn.

At the intersection of each of the auxiliary conveyors 105 with the common input conveyor 101 there is provided an apportioning device 110 the details of which will be discussed below. It can be pointed out here that the apportioning device 110 includes a sweep 111 which can be adjusted to project across part or all of the top surface of conveyor 101. The sweep 111 will thus divert onto the auxiliary conveyor 105 with which it is associated part of the stream of food moving along conveyor 101. The portion of the stream so diverted is determined by the degree to which the sweep 111 projects across the common conveyor. In FIGURE 5 the sweep 111 for the left hand tumbler 100 is against the wall 103 of the common conveyor and hence will divert no food into the left hand or first tumbler. The sweep 111 of the second tumbler projects approximately ⅓ of the way across the common conveyor 101 and will divert roughly ⅓ of the food moving along that conveyor into the second tumbler. The sweep 111 of the third conveyor is set to extend about ⅔ of the way across the common conveyor and will thus intercept about ½ of the remaining food stream or in other words another ⅓ of the original stream. This portion will be diverted into the third tumbler. The sweep 111 of the final tumbler extends all the way across the common conveyor and diverts the remaining ⅓ of the food into the last tumbler.

The food items being chilled or frozen pass through the tumblers 100 where they are mixed with powdered Dry Ice in a manner to be described later. At the exit end of the tumbler the chilled or frozen food items are separated from the Dry Ice which has moved through the tumbler with them and are deposited on a common output conveyor 112. The output conveyor 112 is provided with a motor 113 which drives it from left to right as FIGURE 5 is drawn. This conveyor, like those previously mentioned, can be of various types, although a belt type is used in the embodiment of FIGURE 5. The chilled items from each tumbler spill on to the conveyor 112 and in this manner are merged into a single output stream, which is convenient for further processing and packaging. The output conveyor 112 has side walls 114 and 115 to keep the items moving along the conveyor from spilling off of the sides.

In accordance with the invention special equipment is provided for delivering solid carbon dioxide or Dry Ice in block form to the vicinity of the entrance end of each of the tumblers in a battery where the block Dry Ice is converted to powdered Dry Ice for delivery to and mixing with the food items entering the tumbler. This equipment will be discussed in detail later herein, but its general arrangement can be understood from FIGURES 5, 6 and 9.

Each tumbler 100 is equipped with Dry Ice feed equipment, which in the preferred arrangement serves that tumbler only. The Dry Ice feed equipment includes several components which cooperate to provide powdered Dry Ice to the tumbler. The first component is a block Dry Ice input conveyor 116. As shown most clearly on FIGURE 9, the block input conveyor extends from near the exit end of the tumbler to a point adjacent the entrance end thereof. In doing so the conveyor 116 slopes upwardly. It should also be noted from FIGURE 9 that the block Dry Ice input conveyor 116 is positioned to pass under common output conveyor 112. The conveyor 116 is provided with a drive motor 117 which operates through a drive train including gearbox 118 and belt 119. The top of conveyor 116 is driven by motor 117 in a direction from the bottom to the top of FIGURE 5 and as shown in FIGURE 9, the block input conveyor will thus lift a block of carbon dioxide placed on it near its lower end to the upper end of the conveyor.

A block Dry Ice input unit designated generally as 120 is positioned at the upper end of the block feed conveyor 116 and is generally to one side of the tumbler with which it is associated. The input unit 120 includes a platform 121 positioned to receive blocks of Dry Ice which have been carried to it by the input block feed conveyor 116. The horizontal ram 122 is mounted adjacent the platform 121 in position to push blocks of Dry Ice across it toward the feeding and shaving unit designated generally as 123.

The feeding and shaving unit 123 includes a three-sided housing 124 which serves to define a block Dry Ice feed station in which a block of Dry Ice is held for shaving. As appears more clearly in FIGURES 6 and 9, a vertical ram 125 is mounted above the enclosure 124 in position to force a block of Dry Ice downwardly through it. Immediately below the three-sided housing 124 is a block Dry Ice shaver 126 which converts the block carbon dioxide into powdered carbon dioxide suitable for use in the tumbler. The shaver 126 is preferably of the rotary type and is driven by a motor 127.

The Dry Ice in powdered form issuing from the shaver is directed into the end of tumbler 100 by means of delivery chute 128.

The general mode of operation of the Dry Ice feed system as above described can now be outlined. A block of Dry Ice is placed on block input conveyor 116 at the lower end thereof. Conveyor 116 carries it upwardly and deposits it on platform 121 of block Dry Ice input unit 120. The horizontal ram 122 pushes the block of Dry Ice across the platform 121 and into the three-sided housing 124 of feeding and shaving unit 123. Vertical ram 125 then pushes the block of Dry Ice into the shaver 126 where the block is progressively converted into Dry Ice powder. The Dry Ice powder falls from the shaver through delivery chute 128 into the entrance end of the tumbler.

The foregoing sequence is repeated for each block of Dry Ice.

The tumbler units 100 of the battery of units shown in FIGURE 5 are much like the tumblers described hereinabove but have special features which can be understood by a consideration of FIGURES 6, 7, and 8. The tumbler is mounted on a frame 135 which can be provided with a jack such as that shown in FIGURES 1 and 2 for conveniently varying the pitch of the tumbler. As can be seen in FIGURE 6, the tumbler is tilted at a slight angle so that its input end is somewhat above its output end. The tumbler is covered with a stationary housing 136 to protect it and to retard the flow of heat into the tumbler. Within the housing is a tumbler barrel 137 which is generally cylindrical in shape and which is mounted on the frame 135 for rotation. Rotation is accomplished by means of sprocket 138 which is chain driven by motor 139 (shown on FIGURE 5).

The tumbler of FIGURE 6 like the tumblers described above has a liner 140 which is polygonal in shape; in this embodiment the liner is octagonal instead of hexagonal. The use of a polygon having a larger number of sides makes it more convenient to mount recycle equipment which will be described later inside the tumbler. The reason for this is that the minor radius of the polygon is larger, when the number of sides is larger. The space between the inner liner 140 of the tumbler and the outer cylinder is filled with a suitable insulator 141 such as polyurethane foam.

As mentioned above, the items to be chilled and the powdered Dry Ice are mixed together at the entrance end of the tumbler by the feed equipment for each stream. Thus, a bed of Dry Ice having items to be chilled mixed in and on it is formed on the lower part of the tumbler. This bed is repeatedly overturned or folded as the tumbler rotates and chilling of the items is effected. The overturning bed moves slowly downwardly through the tumbler toward the output end thereof. A portion of the bed consisting of powdered Dry Ice more or less continuously appears at the output region of the tumbler. In the preferred mode of operation of the invention, the Dry Ice in the portion of the bed issuing from the tumbler at any one time is separated from the chilled items, and the separated Dry Ice is returned to a point near the entrance end of the tumbler to there be deposited on the items to be chilled just entering the tumbler.

The equipment for separating and recycling the Dry Ice appearing at the end of the tumbler is shown in FIGURES 6, 7, and 8, and is described in greater detail and claimed in my copending U.S. application, Serial No. 530,737, filed February 28, 1966. At the output end of the tumbler, there is mounted an octagonal separator tube 142. The tube may be constructed from a foraminous sheet or from screen material. It is attached to the barrel 137 for rotation therewith, and as can be seen from FIGURE 6 is slightly larger in diameter than the liner of the tumbler. The insulating cylinder 143 is mounted for rotation on cylinder 137 coaxially with and outside separator tube 142. As can be seen in FIGURES 6 and 8, the diameter of insulating cylinder 143 is sufficiently greater than the diameter of the separator tube 142 that an annular space is provided between them. This space is sealed off at the end by a plate 144 attached to the insulating cylinder 143.

As is shown in FIGURE 8, the annular space between the separator tube 142 and the insulating cylinder 143 is equipped with a series of baffles 145 which extend generally between the interior of the cylinder and the exterior of the tube at a slight angle.

A recycle conveyor 146 is mounted inside the liner 140 in the upper portion thereof. It extends from the output end of the tumbler to a point slightly downstream from the input end. Since this conveyor operates in a cold environment, it should be constructed of materials resistant to low temperatures. The portion of the conveyor 146 which passes through separator tube 142 is equipped with angled side plates 147 which are located at either side of the top of the conveyor so that material falling onto them will slide on to the top of the conveyor. Another baffle 148 is mounted beneath the recycle conveyor 146 within the separator tube. This baffle directs any powdered Dry Ice falling on it back onto the separator tube 142 toward the upstream end thereof.

The mode of operation of the special recycle equipment just described is as follows: As Dry Ice and chilled items flow through the tumbler, they pass from the solid liner portion 140 into the separator tube 142. The sizing of the openings in the separator tube is such that the chilled items cannot pass through them and these items therefore roll or slide through the tube onto common output conveyor 112. The openings in tube 142, however, are large enough to permit the powdered Dry Ice to fall through them. It does so thus and enters the annular space between the tube and the insulating cylinder 143. As the tumbler rotates in a counter clockwise direction as indicated on FIGURE 8, the Dry Ice which has fallen into the annular space at the bottom of the tumbler is lifted by means of baffles 145. As the tumbler continues to rotate powdered Dry Ice carried on a given baffle 145 approaches the top of the tumbler. As it does, it spills off the baffle and through the openings in separator tube 142. Some of it falls through the openings directly onto the top of recycle conveyor 146, and the rest of it falls on to the angled side plates 147 from which it slides onto the top of conveyor 146. The conveyor 146 is driven by a motor 149 (see FIGURE 5) in a direction so that the top run of the conveyor moves in an upstream direction. As a result, the Dry Ice which has been deposited on the conveyor at the lower end thereof is carried upstream into the tumbler and is dumped at the upper end of the tumbler onto the Dry Ice and items to be chilled formed in a bed at the upper end of the tumbler.

Mounted along the side of the conveyor 146 is a scraper bar 149. As can be seen in FIGURE 8, the scraper bar is positioned to knock down food, Dry Ice, and water ice which under some conditions may be carried up the side of the tumbler as it rotates.

The tumbler barrel 137 is desirably provided with an end plate 150 which has an opening in it large enough to permit the entry of Dry Ice by way of chute 128 and items to be chilled by way of conveyor 105. The end plate serves to restrict the flow of warm air into the entrance end of the tumbler and thereby retards wastage of granulated Dry Ice.

The chilling of the items passing through the tumbler results in the conversion of part of the powdered carbon dioxide into carbon dioxide vapor. The carbon dioxide vapor, being heavier than air, flows downwardly through the tumbler and out through output end. FIGURES 6, 18, and 19, illustrate equipment provided in accordance with the invention for disposing of the carbon dioxide vapor formed in the tumblers during operation. This equipment was omitted from FIGURE 5 in order to simplify that view. The equipment shown in FIGURES 6, 18, and 19 is arranged to effectively dispose of the carbon dioxide vapor and at the same time to yield several advantages over alternate systems for doing so.

Each of the tumblers 100 is provided with an exhaust housing 220 which is mounted on frame 135 of the tumbler and which surrounds the output end of the tumbler. As can be seen in the figures, the housing 220 is generally rectangular in configuration and is provided with doors 221, 222 giving convenient access to the equipment at the output end of the tumbler. The output conveyor 112 passes through the exhaust housing 220 through holes 223 and 224 in the sides thereof. In order to retard the flow of gas through the holes 223 and 224, flexible flaps 225 are provided to partly close them.

An exhaust conduit 152 is flexibly connected by coupling 226 to the exhaust housing 220. As can be seen in FIGURES 6 and 18 an exhaust pump 153 is provided in the exhaust conduit 152. The pump 153 is driven by motor 154 and preferably has a pumping capacity greater than the largest volume per unit time of carbon dioxide vapor generated by the tumbler 100. This excess pumping capacity provides an important flexibility in operation and assures complete and satisfactory removal of carbon dioxide vapors even though the vapors are formed at widely varying rates as throughput of items to be chilled is varied. A continuation of the exhaust conduit 152, designated as 152a connects the output side of pump 153 to a main exhaust conduit 227. The main exhaust conduit gathers carbon dioxide vapor from each of the tumbler units and delivers it to a point of exhaust. It should be noted that although in the preferred embodiment a separate pump 153 is employed for each chilling unit, a single pump can be positioned to serve more than one unit, and if desired, all of the units in a battery can be served by a pump located in main exhaust conduit 227.

As pointed out above, the pumping capacity of the pumps 153 is greater than the volume per unit time of carbon dioxide vapor which must be removed. A make-up gas input system is provided for supplying enough additional air so that the pumps 153 run at constant capacity. The gas input system is provided with a main conduit 228 and a separate inlet conduit 229 for each exhaust housing 220.

In the preferred embodiment, the battery of chilling tumblers is located in a room which may be heated for the comfort of the workers, and the main exhaust conduit 227 is arranged so that its point of exhaust is outdoors rather than in the room. Similarly, the point of intake for the input conduit 228 is located out of doors.

Several important advantages result from the carbon dioxide vapor exhaust system just described. The first of these is that build-up of carbon dioxide vapor (and the characteristic cloud of water vapor which accompanies it) in the work room is avoided. Thus, the danger to workers from an atmosphere high in carbon dioxide is obviated, and the danger resulting from the reduced visibility caused by the water vapor cloud is also eliminated. Another advantage, which results from providing source of make-up air at the exhaust housing, that is, at a point downstream from the tumbler, is that the tendency for a stream or draft of warm air to flow into the input end of the tumbler and thence into the exhaust system, under the influence of the exhaust pump, is eliminated. This materially reduces wastage of the powdered Dry Ice in the tumbler. When, as is preferred, the point of intake of the make-up air is outdoors, further advantages are obtained. By this means loss of heated, and possibly conditioned, room air through the exhaust system is eliminated. Furthermore, drafts of outside air into the work room are eliminated, which is an advantage if the outside air tends to be dusty. Finally, as mentioned above, the system provides for great flexibility of throughput, while assuring that all vapors will be exhausted.

The details of the construction of the apportioning devices for common conveyor 101 are shown in FIGURES 10 and 11. From these figures it can be seen that the sweep 111 is pivotally mounted at 155. A positioning rod 156 is mounted on the back of sweep 111, and the other end of the positioning rod is placed in one of a series of holes on bracket 157 at the side of conveyor 101. The sweep 111 is kept from riding up under the influence of food items hitting it by means of hold-down bar 158. This bar is journaled on rods 159 at the edge of conveyor 101 and is spring biased downwardly against the sweep. The position of the sweep is changed in order to vary the amount of food diverted into a given tumbler by lifting bar 158, removing the end of positioning rod 156 from one hole in bracket 157, moving the sweep, replacing the end of rod 156 in another hole of bracket 157, and lowering hold-down bar 158. Various positions of the sweep and of the positioning rod are shown in phantom outline in FIGURE 10.

The constructional features of the Dry Ice supply equipment shown in FIGURE 5 are also shown in the enlarged views of FIGURES 12, 13, and 14. In FIGURE 12, a block of Dry Ice is shown at 160, on block Dry Ice conveyor 116, as it moves up the conveyor toward the block Dry Ice input unit 120. As pointed out before, the input unit 120 includes a platform 121 which extends across the upper end of conveyor 116 to the feeding and shaving unit 123. A cantilevered bar 161 extends outwardly from platform 121 and provides a mount for the horizontal ram 122. The horizontal ram is preferably an air operated cylinder and piston having a piston rod 162 which carries a pusher plate 163 on the end thereof. The stroke of the piston of ram 122 is of such a length that upon actuation it will push a block of Dry Ice, such as that shown at 164, across the platform 121 and into the three-sided enclosure or housing 124. The pusher plate 163 thus forms the fourth side of the enclosure 124 when the ram is in its extended position.

A control rod 165 is mounted on the back of pusher plate 162 and extends generally parallel to the axis of the ram 122. At the end of the rod is a switch operating lever 166 which actuates switch SW–6 whose function will be described later. The pusher plate 163 itself operates an additional switch SW–1. Two other switches SW–2 and SW–3a are mounted beneath platform 121 so that they will be actuated by the weight of a block of ice on the platform at the ram end, thereof, in approximately the same position as ice block 164.

As can best be seen in FIGURE 13, the three-sided housing 124 is mounted on the rotary shaver 126, and the disc 167 of the shaver in effect forms the floor of the housing 124. Stated differently, a block of Dry Ice such as 168 inside housing 124 sits on disc 167.

A frame 175 is attached to the three-sided enclosure 124, and to the frame 135 of the tumbler, to provide a mounting for vertical ram 125 and its associated equipment. The ram 125 is located directly above the housing 124. Like horizontal ram 122, ram 125 is of the piston and cylinder type and has a piston rod projecting from the bottom thereof. The piston rod 176 is fitted with a pusher plate 177. This plate is generally rectangular in shape, and as can be seen in FIGURES 12 and 13, is sized to close the top of housing 124. The length of the stroke of the piston of ram 125 is such that when the ram is actuated downwardly, plate 177 moves through enclosure 124 toward the disc 167 of the shaver to a position immediately adjacent the disc. The ram during its upward stroke lifts plate 177 through the enclosure 124 to a position at the top thereof as shown in FIGURE 13. Mounted beside the vertical ram 125 is an automatic throttling device 178. Devices of this type are well known; the type manufactured and sold under the trademark Bellow's Valvair is quite suitable for the purposes of this invention. The general function of this piece of equipment is to permit the ram 125 to advance plate 177 quickly in a downward direction until it encounters a block of Dry Ice such as 168 and then to reduce the rate of advancement of plate 177 to a slower pre-selected rate. This last mentioned rate can be varied to vary the rate at which a block of Dry Ice is shaved, and hence to vary the number of pounds per minute of powdered Dry Ice formed by the shaver.

A control rod 179 is mounted on the top of pusher plate 177 and extends upwardly beside ram 125. The control rod carries a first switch tripping arm 180 positioned to trip switch SW–3 and switch SW–6a and a second switch tripping arm 181 positioned to trip switch SW–4.

It should be noted that the piston rod 182 of the throttling unit is connected to the piston rod 176 for movement with it by means of bar 183. Switch SW–5 is mounted on the top of plate 177, and its operating lever extends to contact with bar 183. The slight foreshortening of the distance between the plate 177 and the bar 183 which occurs when plate 177 encounters a block of Dry Ice such as 168 is sufficient to cause actuation of switch SW–5 to thus provide a signal for initiation of operation of the automatic throttle 178.

The block Dry Ice shaver 126 is mounted on a frame which is attached to the frame 135 of the tumbler. The disk 167 of the shaver is positioned inside a generally cylindrical housing 191. The disk 167 is carried on a vertical axle 192 which is journalled through the bottom of the housing 191. Drive sprocket 193 is fitted to the end of the axle. Power for driving disk 167 is supplied through the sprocket by motor 127.

As is shown in FIGURE 14, shaving disk 167 is provided with three radial slots 194, each of which is fitted with a shaving blade 195. Powdered Dry Ice which has been shaved from the bottom of a block of Dry Ice as the blades rotate with disk 167 falls through the slots 194 into the interior of cylindrical housing 191 below disk 167. Fitted to the bottom of the disk are three curved vanes 196 which act on the powdered Dry Ice within the housing to drive it toward the circumference thereof as disk 167 rotates. The housing 191 has an opening 197 at the side thereof adjacent the tumbler. Thus, the powdered Dry Ice is driven through this opening by the vanes 196.

Delivery chute 128 is attached to housing 191 in a position to receive the powdered Dry Ice moving through opening 197 in the housing. The chute 128 includes a bottom piece 198 and a top shield 199. The bottom piece 198 extends from the opening 197 in the housing to and partly into the entrance end of the tumbler 100. In this way the powdered Dry Ice formed at the shaver is delivered with minimum loss into the tumbler. This arrangement provides for delivery of the shaved Dry Ice to the tumbler substantially immediately upon the shaving thereof. Such direct delivery minimizes losses.

Another form of Dry Ice shaving equipment is illustrated in FIGURES 15 and 16. In these figures a block of Dry Ice 200 is shown in position for shaving. The pusher plate 201 is similar to pusher plate 177 and is preferably actuated by a vertical ram such as that marked 125 in FIGURE 13. Pusher plate 201 is used to advance the block Dry Ice 200 into the shaver. The unit of FIGURES 15 and 16 is provided with sloping walls 202 to restrain sideward movement of the block of Dry Ice during shaving. The block of ice 200 can be delivered into the shaver through the open top thereof, or if desired, one of the sloping walls 202 can be omitted and the ice block can be delivered from the side in a manner similar to that used with the shaver in FIGURES 12 and 13.

The shaver of FIGURES 15 and 16 is provided with a generally cylindrical housing 203 which is horizontally oriented and is closed at the ends. The housing has an input opening 204 at the top, and an output opening 205 is arranged to feed powdered Dry Ice into the delivery chute leading to the entrance end of a tumbler. The shaver is equipped with a drive shaft 206 which is mounted for rotation on the axis of housing 203 by means of bearings 207. The shaft 206 carries on it a shaving cylinder 208 which is somewhat smaller in diameter than the interior diameter of housing 203. There is thus formed within the shaver an annular space 209 which forms a flow path for powdered Dry Ice from the input opening 204, where the powdered Dry Ice is formed to the output 205 through which it is delivered from the shaver.

The surface of shaver cylinder 208 is provided with several blade cutouts 210 which are spaced around the periphery of the cylinder. The blade 211 is bolted into each cutout with its cutting edge projecting beyond the surface of the cylinder. As can be seen in FIGURE 15, blades are angled somewhat in the direction of rotation of cylinder 208 to obtain a good shaving angle when they contact the block of Dry Ice 200.

A sprocket, not shown, is fitted on the exterior portion of shaft 206 so that driving power can be supplied to it.

FIGURE 17 is a simplified control diagram for the Dry Ice and shaving equipment shown in the embodiment of FIGURES 5 to 14. The physical arrangement of the control switches shown of FIGURE 17 has been explained above in connection with FIGURES 12 and 13 and the positions of the switches can be seen on those figures. The control system shown in FIGURE 17 is divided into a high voltage circuit appearing above transformer T in the figure and the low voltage circuit appearing below the transformer. The high voltage side of the circuit may be about 220 volts while the low voltage side may be about 10 volts.

The drive motor 127 for the shaver is connected across the high voltage side of the circuit so that it runs substantially continuously. The motor 117 for the block Dry Ice input conveyor 116 is also wired into the high voltage side of the circuit through two switches arranged in series. The first of these, SW1, is biased to be normally opened, and closes the circuit for motor 117 when it is closed by contact with pressure plate 163. The second switch SW2 is biased to be normally closed, and is opened by the weight of a block of ice on platform 21. When it is open, the current to motor 117 is interrupted. Since switches SW1 and SW2 are in series, both of them must be closed before motor 117 will be energized.

In the lower voltage portion of the circuit are the control elements for the horizontal ram 122, the vertical ram 125, and the throttling device 178. The horizontal ram is equipped with solenoids which operate air valves, thus, the solenoid marked ADV SOL, when actuated, operates a valve to admit air to advance the ram. Similarly, the solenoid marked RET SOL when activated operates a valve for returning the ram to its rest position. The vertical ram 125 is provided with similar solenoids marked UP SOL and DOWN SOL. The operation of the throttling device is initiated with throttling solenoid TH SOL.

The advance solenoid ADV SOL for the horizontal ram is actuated through a pulsing circuit which includes switches SW3 and SW3a. The pulsing circuit further includes diode D1, wired in series with a resistor R1, and a capacitor C1, wired in parallel with a resistor R2. The pulsing circuit is of the type in which a charge is built up relatively slowly on the capacitor whenever a circuit is closed between points A and B on FIGURE 17. Such a circuit can be completed in two ways. It is completed when switch SW3 is in its down position. It is also completed when switch SW3 is in its up position and at the same time switch SW3a is in its down position as FIGURE 17 is drawn. The energy stored in capacitor C1 as a result of its charging as just described is delivered quickly, in fact, in a pulse, to the advance solenoid ADV SOL when switch SW3 is in its up position, and switch SW3a is in its up position.

Switch SW3 is biased to its down position, and is held in its up position by switch tripping arm 180. When tripping arm 180 moves away from switch SW3, the switch moves to its down position, making it impossible for the horizontal ram to advance while the vertical ram 125 is lowering. Switch SW3a is biased to its down position, and so long as it is in this position, the horizontal ram cannot be advanced. It is moved to its up position by the weight of a cake of a block of ice on the platform (see FIGURE 12). In summary, the advance solenoid for the arm receives a pulse of energy from C1 only when switch SW3 is held up by arm 180, that is, only when the vertical ram is in the up position, and when a block of ice has moved switch SW3A to its up position. During all other portions of the operation, the capacitor is receiving a charging current through diode D1, resistor R1 and either switch SW3 alone or switch SW3a and SW3 in series.

The return solenoid RET SOL is energized through switch SW4. This switch is biased to be normally opened, and is closed by switch tripping arm 181 as the vertical arm moves downwardly. The time during which switch SW4 is held closed is long enough to assure positive activation of the solenoid without the use of a pulsating device.

The down solenoid DOWN SOL of the vertical ram 125 is provided with a pulsing device for actuation similar to that used on the advance solenoid used on the horizontal ram. The pulsing device circuit includes switch SW6, diode D2 connected in series with a resistor R3, and capacitor C2 connected in parallel with resistor R4. A charge will be placed on capacitor C2 whenever a circuit is established between points E and F of FIGURE 17. This condition will occur whenever switch SW6 is in its down position. When SW6 is in its up position, a pulse of energy is delivered from capacitor C2 to the down solenoid.

Switch SW6 is biased toward its down position, and is moved to its up position by switch operating lever 166 as the horizontal ram comes to the end of its forward stroke.

The up solenoid UP SOL of the vertical ram is actuated by switch SW6A. This switch is biased to be normally opened, and is closed by arm 180 when the vertical ram has reached the bottom of its stroke.

The actuating solenoid TH SOL for the throttling device is actuated by switch SW5, which is biased to be normally opened. As explained above, switch SW5 is closed when pusher plate 177 makes contact with a block of Dry Ice.

On occasion, it is desired to actuate the solenoid of the vertical ram manually. In order to accomplish this there is provided a manual switch SW7 which is biased to its neutral position. When it is held upwardly it activates the down solenoid, and when it is held downwardly it actuates the up solenoid.

The over-all operation of a chilling system incorporating ganged tumblers according to the method and apparatus of this invention is as follows. The common input conveyor 101, and the auxiliary conveyors 105, preferably run continuously and at a substantially constant rate. Similarly, the common output conveyor 112 is preferably run continuously and at a constant rate. The conveyor operating rates selected are high enough to accommodate wide variations in the rate of throughput, without being so high that the material being processed is subjected to damage.

The tumblers 100 of the battery shown in FIGURE 5 are preferably rotated at constant speeds which are more or less uniform from one tumbler to another. It has been found most convenient to adjust the throughput capacity of a given tumbler by varying its pitch. In general, the greater the pitch for a given rotative speed and a given type of product being chilled, the greater the throughput capacity of the tumbler.

In a system of the kind referred to, it is preferred to divide the food or other items to be chilled or frozen into portions which are approximately equal for each of the tumblers being operated at any one time. In many installations it will be desirable to hold one of the tumblers off stream as a spare during routine operations. Once the conveyor speeds for a system are established and once the rotative speeds and pitch angles of the tumblers are established, the flow rate of items to be chilled through the system and through its part is established by metering items to be chilled on to common input conveyor 101 at the desired rate, and by adjusting the apportioning devices 110 for the tumblers to divide the over-all incoming stream of items into more or less equal portions for the several tumblers. The output conveyor should, of course, be operated at a rate sufficient to carry away all of the chilled items issuing from the tumblers.

When each tumbler is brought on stream, block Dry Ice is fed to the shaver of that tumbler at a rate greater than that theoretically required to effect the desired chilling of the items being fed into the tumbler. In this way an excess of powdered Dry Ice is established in the tumbler in the form of a bed containing on it and in it the items being chilled. The excess of Dry Ice residing in the tumbler at any one time, over the amount actually required for chilling the items in the tumbler at any one time, is maintained throughout the chilling operation. Since there is always an excess of powdered Dry Ice in the tumbler, a portion of that excess will continually appear at the output end of the tumbler, where it is separated and recycled.

Once the resident excess of powdered Dry Ice is established in the tumbler as the tumbler is brought on stream, the feed rate of the Dry Ice is reduced to a rate substantially equal to that required to effect the desired chilling of the items being fed. However, precise balance between the feed of items and the feed of powdered Dry Ice is not essential because a certain tolerance in this respect is provided in accordance with the invention. If the rate of feed of Dry Ice is greater than is theoretically required, the chilled items will issue from the tumbler somewhat colder than the target reduction in temperature. On the other hand, if the feed of Dry Ice is slightly lower than the theoretical requirement, the temperature of the items being chilled will be a few degrees warmer than the target temperature.

The rate at which powdered Dry Ice is fed is adjusted to take into account the factors just discussed by controlling the rate at which a given block is shaved; this rate is adjusted by means of throttling device 178 (see FIGURE 13) which controls the rate of advancement of pusher plate 177 downwardly toward the shaver.

In general, it is desired to have the interval between the shaving of one block and the shaving of the next as short as possible so that the flow of fresh powdered Dry Ice into the tumbler will be as continuous as possible. This is of special interest when the feed of items to be chilled is substantially continuous and uniform. For this reason, the rate of shaving is the principal variable adjusted to vary the number of blocks of Dry Ice shaver per unit time and hence, the number of pounds of fresh powdered Dry Ice fed per unit time. However, if too much Dry Ice accumulates in the tumbler, the input of blocks of Dry Ice can be temporarily interrupted or slowed down.

As the tumblers rotate, the bed of Dry Ice is repeatedly folded as it moves slowly downstream. The bed is continually reestablished at its rearmost section by the fresh input of Dry Ice and items to be chilled. A portion of the bed, which may be thought of as its leading edge, continually appears at the output end of the tumbler. Here the powdered Dry Ice is separated from the chilled items and placed on the recycle conveyor 146. This conveyor carries the Dry Ice back upstream and deposits it on the bed of Dry Ice being formed there.

For satisfactory operation it is desirable to have an adequate quantity of powdered Dry Ice in the bed at each point along its length in addition to having an overall excess of Dry Ice residing in the tumbler at any one time. However, because of the inherent intermittent nature of the block Dry Ice shaving operation, there will be brief intervals even under the best of conditions when no fresh Dry Ice is being fed into the tumbler. The recycled Dry Ice, resulting from the provision of a resident excess in the tumbler, which is deposited at the entrance end of the tumbler compensates for the interruption in the fresh powdered Dry Ice feed and thereby insures that an adequate amount of Dry Ice exists throughout the bed. The feed of powdered Dry Ice directly from shaved blocks, and the substantially continuous and preferably total Dry Ice recycle from the output end of the tumbler, cooperate together to insure an adequate amount of Dry Ice at the entrance end at all times.

The chilled items, after separation of Dry Ice, leave the tumblers and fall onto output conveyor 112. The items by reason of their chilling or freezing have sufficient structural strength that there is no substantial danger of damage to them in the merging of the streams from the several tumblers on the output conveyor.

The advantages provided by the present invention may be appreciated by a consideration of several examples. In one operation, it was desired to freeze cherries of the kind used in pie baking operations to a temperature of $-20°$ F. without rupturing the cherries, which would cause undesirable loss of juice, and without causing the cherries to be frozen together, which would complicate further packing operations. An installation substantially like that shown in FIGURE 5 was employed, with three tumblers normally operating and the fourth held in reserve. This installation successfully froze the cherries at a rate of approximately 64 tons per eight hour shift, utilizing approximately 60 tons of block carbon dioxide per shift. The ganged machines required only four attendants and performed the freezing operation at only a fraction of the cost of the freezing system previously used for the same job.

At another installation it was desired to freeze fresh blanched mushrooms in a manner so that the mushrooms would not be bruised and would not be stuck together when frozen. In this installation only a single unit, of the type shown in FIGURE 6, was employed. This unit met the above requirements and produced frozen mushrooms at a rate of 1500 pounds per hour with a Dry Ice consumption of about 1400 lbs. per hour. The machine required only a single attendant.

In a third installation, it was desired to lower the temperature of freshly made frankfurters from about 50° F. to about 38° F. A unit of the kind shown in FIGURE 6 performed this operation quite satisfactorily.

I claim:

1. A chilling system for lowering the temperature of discrete items by the use of solid carbon dioxide comprising: a plurality of chilling tumblers arranged side by side, each of said tumblers being adapted to intimately mix said items and powdered carbon dioxide to effect chilling of said items, each of said tumblers having an input end and an output end, a common input conveyor extending from a source of items to be chilled to the input ends of said chilling tumblers, said conveyor being adapted to deliver a stream of items to be chilled from the source thereof toward the input ends of said chilling tumblers, plural apportioning means, one of such means being positioned adjacent the input end of each of said tumblers, and having an element projecting into the stream of items on said conveyor for diverting a portion of said stream into the entrance end of said adjacent chilling tumbler, each of said chilling tumblers being provided with solid carbon dioxide feed means for introducing powdered carbon dioxide, said feed means comprising a shaver and block carbon dioxide feed means including a pressure plate movable toward said shaver for sequentially urging blocks of carbon dioxide thereinto to form powdered carbon dioxide, each of said chilling tumblers having at the output end thereof separator means for separating chilled items and powdered carbon dioxide appearing at said output end, each of said tumblers having recycle means providing for recycling of powdered carbon dioxide from said separator means to said tumbler, and a common output conveyor extending from the separator means of each of said chilling tumblers to a handling station for chilled items, said output conveyor receiving and carrying a stream of chilled items from said tumblers to said station.

2. A chilling system for lowering the temperature of discrete items by the use of solid carbon dioxide comprising: a chilling tumbler adapted to intimately mix said items and powdered carbon dioxide to effect chilling of said items, said tumbler having an input end and an output end, means for delivering a stream of items to be chilled from a source thereof to the input end of the tumbler, said chilling tumbler being provided with solid carbon dioxide feed means for introducing carbon dioxide into the input end thereof, said feed means comprising a power driven shaver, a block carbon dioxide feed station positioned adjacent said shaver, a ram movable through a path extending from a position exterior of said station, into said feed station toward said shaver to thereby provide for forced feed of a block of carbon dioxide into said shaver, loading means for said feed station including a carbon dioxide block input station adjacent said feed station, power means for urging a block of carbon dioxide from said input station to said feed station, and control means disabling said power means when said ram is passing into said feed station, said tumbler having recycle means providing for substantially total recycling of powdered carbon dioxide appearing at the output end of the tumbler, said recycle means being operative during loading of carbon dioxide blocks to provide for uninterrupted feed of powdered carbon dioxide to the stream of items to be chilled being delivered into the input end of said tumbler.

3. A chilling system for lowering the temperature of discrete items by the use of solidified carbon dioxide comprising: a plurality of chilling tumblers arranged side by side, each of said tumblers being adapted to intimately mix said items and powdered carbon dioxide to effect chilling of said items, each of said tumblers having an input end and an output end, a common input conveyor extending from a source of items to be chilled to the input end of said chilling tumblers, said conveyor being adapted to deliver a stream of items to be chilled from the source thereof toward input end of said chilling tumblers, plural proportioning means, one of such means being positioned adjacent the input end of each of said tumblers, and having an element projecting into the stream of items on said conveyor for diverting a portion of said stream into the entrance end of said adjacent chilling tumbler, each of said chilling tumblers being provided with a power operated solid carbon dioxide feed means at the input end thereof, said feed means having a control device for varying the rate of feed of solid carbon dioxide from the feed means to the input end of the tumbler, each of said chilling tumblers having at the output end thereof separator means for separating chilled items and powdered carbon dioxide, and a common output conveyor extending from the separator means of all of said chilling tumblers to a handling station for chilled items, said output conveyor receiving and carrying a stream of chilled items from said tumblers to said station.

4. A chilling system for lowering the temperature of discrete items by the use of solid carbon dioxide comprising: an inclined chilling tumbler adapted to intimately mix said items and powdered carbon dioxide to effect chilling of said items, said tumbler having an input and an output end, power means for rotating said tumbler, means for varying the pitch of said tumbler to thereby change the rate of flow of mixed items and carbon dioxide through the tumbler under the influence of gravity, an input conveyor extending from a source of items to be chilled to the input end of said chilling tumbler, said conveyor being adapted to deliver a stream of items to be chilled from a source thereof to the input end of the tumbler, metering means for regulating the size of said stream of items being delivered to the input means by the conveyor, said chilling tumbler being provided with solid carbon dioxide feed means at the input end thereof, said feed means comprising a shaver for converting blocks of carbon dioxide into powdered carbon dioxide, delivery means for feeding powdered carbon dioxide produced by said shaver into the input end of the chilling tumbler, power operated block carbon dioxide advancing means positioned to advance a block of carbon dioxide into said shaver for shaving, and means for varying the rate at which said advancing means feeds a block of solid carbon dioxide into said shaver.

5. A chilling system for lowering the temperature of discrete items by the use of solid carbon dioxide comprising: a chilling tumbler adapted to intimately mix said items and powdered carbon dioxide to effect chilling of said items, said tumbler having an input and an output end, a power driven shaver, means for delivering powdered carbon dioxide from said shaver to the input end of said tumbler, power means for forcing a block of solid carbon dioxide into said shaver for shaving, control means for said power means for selectively varying the rate at which said power means forces a block of solid carbon dioxide into said shaver, means for positioning a block of solid carbon dioxide for forcing into said shaver, means for actuating said power means upon operation of said positioning means to position a block of carbon dioxide for forcing into said shaver, and means responsive to operation of said power means for disabling operation of said positioning means while said power means are forcing a block of carbon dioxide into said shaver.

6. A method of chilling articles comprising: advancing a mixture of the articles with powdered solid carbon dioxide downstream through a moving bed having input and output ends, tumbling the mixture during said downstream advancement, feeding the articles to be chilled into the input end of the bed, in the region of the input end of the bed shaving solid carbon dioxide in block form at a preselected rate to produce powdered solid carbon dioxide, introducing the shaved powdered solid carbon dioxide into the bed at a rate substantially equal to the rate at which said powdered carbon dioxide is formed by shaving, and discharging the chilled articles from the output end of the bed.

7. A method for chilling articles comprising: advancing a mixture of the articles with powdered solid carbon dioxide downstream through a moving bed having input and output ends, tumbling the mixture during said downstream advancement, feeding the articles to be chilled into the input end of the bed, sequentially shaving solid carbon dioxide blocks to produce powdered carbon dioxide, introducing the powdered carbon dioxide into the bed as it is produced, the rate of shaving initially being sufficient to effect a preselected degree of chilling of said articles and to establish an excess of carbon dioxide in said bed, the rate of shaving after establishment of said excess being sufficient to effect the desired degree of chilling of said articles, discharging the chilled articles and a portion of the powdered carbon dioxide from the output end of the bed, and recirculating said discharged portion of solid carbon dioxide to an upstream portion of the moving bed.

8. Apparatus for use in chilling articles comprising a rotative tumbler having input and output ends and adapted to receive articles to be chilled and powdered solid carbon dioxide introduced into the input end and to establish a bed of intermixed articles and powdered solid carbon dioxide moving downstream toward the output end of the tumbler, and mechanism for introducing powdered solid carbon dioxide into the tumbler including means for supporting a block of solid carbon dioxide in the region of the inlet end of the tumbler and means for shaving said block to produce powdered solid carbon dioxide and for delivering the shaved powder into the tumbler.

9. Apparatus according to claim 8 in which the block shaving means includes a rotative bladed device and means for yieldingly urging the block and the rotor against each other.

10. Apparatus according to claim 9 and further including means for controllably varying the pressure of interengagement of the block and rotor.

11. Apparatus according to claim 8 in which the supporting means for the block of solid carbon dioxide is positioned to support the block at an elevation above the upstream end of the moving bed in the tumbler to provide for gravity feed of the shaved powdered solid carbon dioxide into the bed.

12. Apparatus for use in chilling articles comprising a rotative tumbler having input and output ends and adapted to receive articles to be chilled and powdered solid carbon dioxide introduced into the input end and to establish a bed of intermixed articles and powdered solid carbon dioxide moving dowstream toward the output end of the tumbler, and mechanism for introducing powdered solid carbon dioxide into the tumbler including means for supporting a block of solid carbon dioxide in the region of the inlet end of the tumbler, means sequentially delivering blocks of solid carbon dioxide to the supporting means, means for sequentially shaving the blocks when they are supported by the supporting means to produce powdered solid carbon dioxide, and means for directing the shaved powder into the moving bed in the tumbler.

13. Apparatus for use in chilling articles comprising: a rotative tumbler having input and output ends and adapted to receive articles to be chilled and powdered solid carbon dioxide introduced into the input end, said tumbler providing for movement of a bed of intermixed articles and powdered solid carbon dioxide toward the output end of the tumbler whereby said articles are chilled and at least part of said solid carbon dioxide is converted to vapor during said movement, means for introducing articles and solid carbon dioxide into the input end of the tumbler, carbon dioxide vapor exhaust means for the output end of the tumbler comprising: an exhaust housing surrounding the output end of the tumbler, power operated pump means for withdrawing vapor from said housing, said pump means having a pumping capacity substantially in excess of the volume of carbon dioxide vapor generated by said tumbler during operation thereof, inlet means for said housing providing for introduction of make-up gas thereinto in an amount sufficient, when taken with the volume of carbon dioxide vapor generated by the tumbler, to equal the pumping capacity of said pumping means.

14. Apparatus according to claim 13 wherein said tumbler is installed in a room, wherein said inlet means comprises a gas conduit connecting said exhaust housing with a source of outdoor air, and wherein said carbon dioxide vapor exhaust means further include an exhaust conduit connected to said pump means for delivering exhaust vapors to the outdoors.

15. A chilling system for lowering the temperature of discrete items by the use of solidified carbon dioxide comprising: a plurality of chilling tumblers arranged side by side, each of said tumblers being adapted to intimately mix said items and powdered carbon dioxide to effect chilling of said items, at least part of said powdered carbon dioxide being converted to vapor in the tumbler in the course of said chilling, each of said tumblers having an input end and an output end, a common input conveyor extending from a source of items to be chilled to the input end of said chilling tumblers, said conveyor being adapted to deliver a stream of items to be chilled from the source thereof to the input end of each tumbler, solid carbon dioxide feed means at the input end of each tumbler, a common output conveyor extending from the output ends of all of said chilling tumblers to a handling station for chilled items, each of said chilling tumblers being provided with an exhaust housing surrounding the output end of its tumbler, common exhaust conduit means connected to each of said housings and extending to a common point of exhaust, power operated pump means in said exhaust conduit means for withdrawing vapor from said housings, said pump means having a pumping capacity substantially in excess of the volume of carbon dioxide vapor generated by said tumblers during operation thereof, common inlet conduit means extending from a common intake point to each of said exhaust housings providing for introduction of make-up gas thereinto in an amount sufficient, when taken with the volume of carbon dioxide vapor generated by the tumblers, to equal the pumping capacity of said pumping means.

16. Apparatus in accordance with claim 15 in which said common output conveyor passes through each of said exhaust housings.

17. Apparatus in accordance with claim 15 wherein said chilling tumblers are installed in a room, and wherein said point of exhaust of the exhaust conduit means and the point of intake of said inlet conduit means are outdoors.

18. Apparatus for use in chilling articles comprising a rotative tumbler having input and output ends and adapted to receive articles to be chilled and powdered solid carbon dioxide introduced into the input end and to establish a bed of intermixed articles and powdered solid carbon dioxide moving downstream toward the output end of the tumbler, and mechanism for introducing powdered solid carbon dioxide into the tumbler including means for supporting a block of solid carbon dioxide in the region of the inlet end of the tumbler, means sequentially delivering blocks of solid carbon dioxide to the supporting means, means for sequentially shaving the blocks when they are supported by the supporting means to produce powdered solid carbon dioxide, means for directing the shaved powder into the moving bed in the tumbler, control mechanism for the block delivery means including means responsive to operation of said block delivery means for sequentially shaving blocks of carbon dioxide and means operated by the responsive means to deactivate the delivery means during shaving of a block.

References Cited by the Examiner

UNITED STATES PATENTS

| | | | |
|---|---|---|---|
| 2,839,254 | 6/1958 | Smith | 62—321 X |
| 2,919,560 | 1/1960 | Beemer et al. | 62—321 |
| 3,213,634 | 10/1965 | Granata | 62—384 X |
| 3,214,928 | 11/1965 | Oberdorfer | 62—64 X |

MEYER PERLIN, *Primary Examiner.*

ROBERT A. O'LEARY, *Examiner.*

W. E. WAYNER, *Assistant Examiner.*